(12) United States Patent
Brown et al.

(10) Patent No.: US 10,776,439 B2
(45) Date of Patent: Sep. 15, 2020

(54) EFFICIENT LOG-FILE-BASED QUERY PROCESSING

(71) Applicant: VMware, Inc., Palo Alto, CA (US)

(72) Inventors: Darren Brown, Seattle, WA (US); Nicholas Kushmerick, Seattle, WA (US); Mayank Agarwal, Seattle, WA (US); Junyuan Lin, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 277 days.

(21) Appl. No.: 15/816,434

(22) Filed: Nov. 17, 2017

(65) Prior Publication Data

US 2019/0155953 A1    May 23, 2019

(51) Int. Cl.

| | |
|---|---|
| *G06F 16/9535* | (2019.01) |
| *G06F 16/27* | (2019.01) |
| *G06F 16/9038* | (2019.01) |
| *G06F 16/188* | (2019.01) |
| *G06F 16/17* | (2019.01) |
| *G06F 16/11* | (2019.01) |
| G06F 16/23 | (2019.01) |
| G06F 16/245 | (2019.01) |

(52) U.S. Cl.
CPC ...... *G06F 16/9535* (2019.01); *G06F 16/1734* (2019.01); *G06F 16/188* (2019.01); *G06F 16/27* (2019.01); *G06F 16/9038* (2019.01); G06F 16/128 (2019.01); G06F 16/2358 (2019.01); G06F 16/245 (2019.01)

(58) Field of Classification Search
CPC .... G06F 16/27; G06F 11/1438; G06F 16/128; G06F 16/1734; G06F 16/2358; G06F 16/245; G06F 16/24568; G06F 16/2477
USPC ................................................ 707/602, 741
See application file for complete search history.

(56) References Cited

U.S. PATENT DOCUMENTS

| | | | |
|---|---|---|---|
| 9,811,549 B2* | 11/2017 | Schreter | G06F 16/2358 |
| 10,169,169 B1* | 1/2019 | Shaikh | G06F 11/1474 |
| 2015/0169655 A1* | 6/2015 | Gupta | G06F 16/221 |
| | | | 707/602 |
| 2016/0241676 A1* | 8/2016 | Armstrong | G06F 16/2358 |
| 2017/0004067 A1* | 1/2017 | Lentz | G06F 11/3664 |
| 2017/0116210 A1* | 4/2017 | Park | G06F 11/1471 |
| 2018/0285419 A1* | 10/2018 | Chernov | G06F 16/24542 |
| 2018/0336229 A1* | 11/2018 | Muehle | G06F 16/22 |

* cited by examiner

*Primary Examiner* — Dangelino N Gortayo

(57) ABSTRACT

The current document is directed to systems, and methods incorporated within the systems, that execute queries against log-file entries. A monitoring subsystem within a distributed computer system uses query results during analysis of log-file entries in order to detect changes in the state of the distributed computer system, identify problems or potential problems, and predict and forecast system characteristics. Because of the large numbers of log-file-entry containers that may need to be opened and processed in order to execute a single query, and because opening and reading through the entries in a log-file-entry container is a computationally expensive and time-consuming operation, the currently disclosed systems employ event-type metadata associated with log-file-entry containers to avoid opening and reading through the log-file entries of log-file-entry containers that do not contain log-file entries with event types relevant to the query.

20 Claims, 33 Drawing Sheets

1202  1208  1210

2013-12-02T10:44:24.095Z li-qe-esx5.vmware.com Rhttpproxy:
[28959B90 verbose 'Proxy Req 46691'] Connected to
localhost:8307 ———— 1212       ～1206

2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59

2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'

2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)

2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction

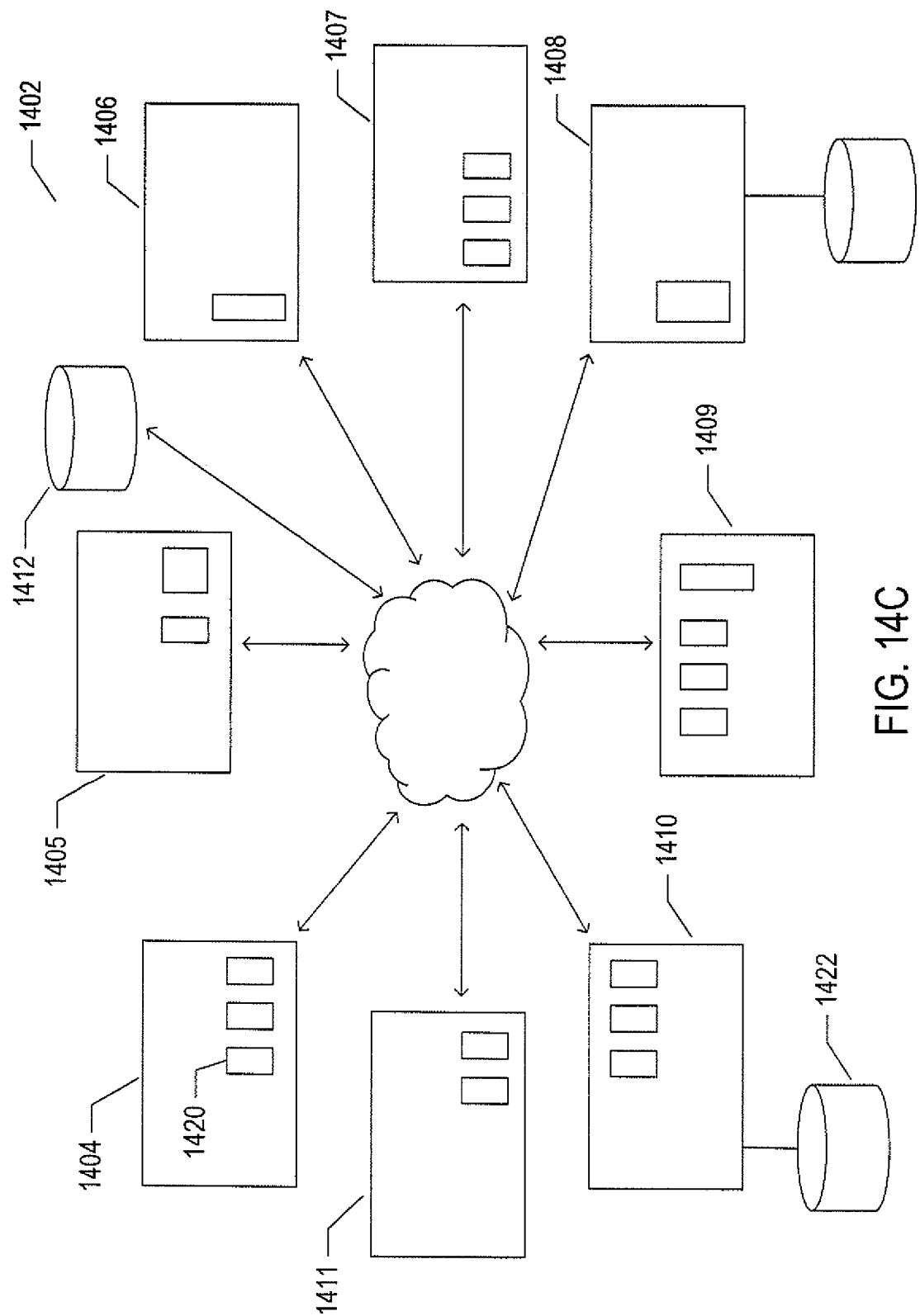

EFFICIENT LOG-FILE-BASED QUERY PROCESSING

TECHNICAL FIELD

The current document is directed to event logging and log files and, in particular, to systems, and methods incorporated within the systems, that carry out query processing on log-file entries.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures, and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. It has proved to be a challenging task for system administrators, system designers and developers, and system users to identify information within the enormous event logs generated in distributed computing systems relevant to detecting and diagnosing operational anomalies and useful in administering, managing, and maintaining distributed computer systems.

SUMMARY

The current document is directed to systems, and methods incorporated within the systems, that execute queries against log-file entries. A monitoring subsystem within a distributed computer system uses query results during analysis of log-file entries in order to detect changes in the state of the distributed computer system, identify problems or potential problems, and predict and forecast system characteristics. Because of the large numbers of log-file-entry containers that may need to be opened and processed in order to execute a single query, and because opening and reading through the entries in a log-file-entry container is a computationally expensive and time-consuming operation, the currently disclosed systems employ event-type metadata associated with log-file-entry containers to avoid opening and reading through the log-file entries of log-file-entry containers that do not contain log-file entries with event types relevant to the query.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIGS. 14A-C illustrate a simplified picture of log entries and log files that is used in the remaining discussion of the virtual log file to which the current application is directed.

DETAILED DESCRIPTION

Figure 1:
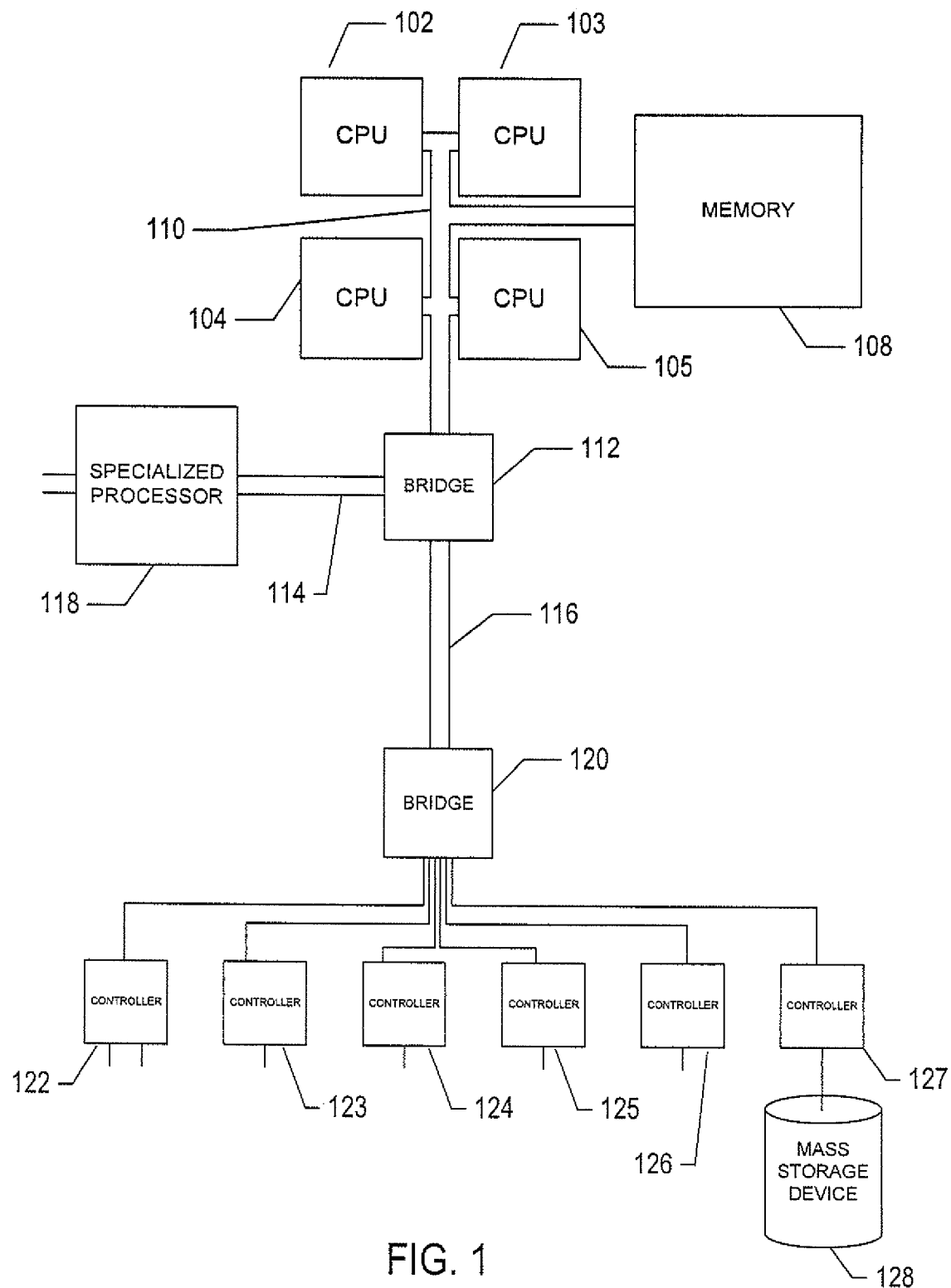
FIG. 1 provides a general architectural diagram for various types of computers.

The current document is directed to systems, and methods incorporated within the systems, that execute queries against log-file entries. In a first subsection, below, a detailed description of computer hardware, complex computational systems, and virtualization is provided with reference to FIGS. 1-10. In a second subsection, efficient query execution against log-file entries is discussed with reference to FIGS. 11-22E.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
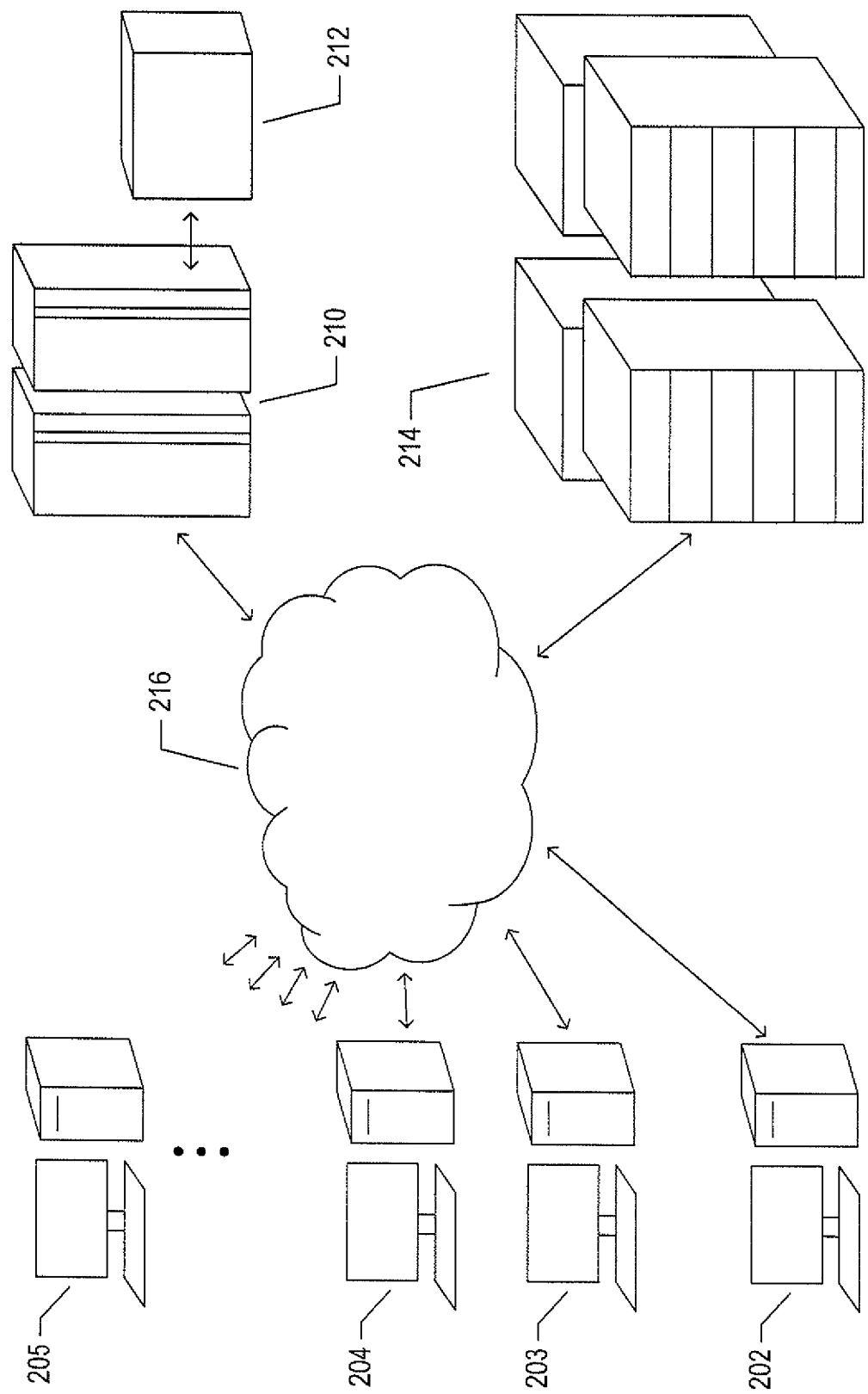
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
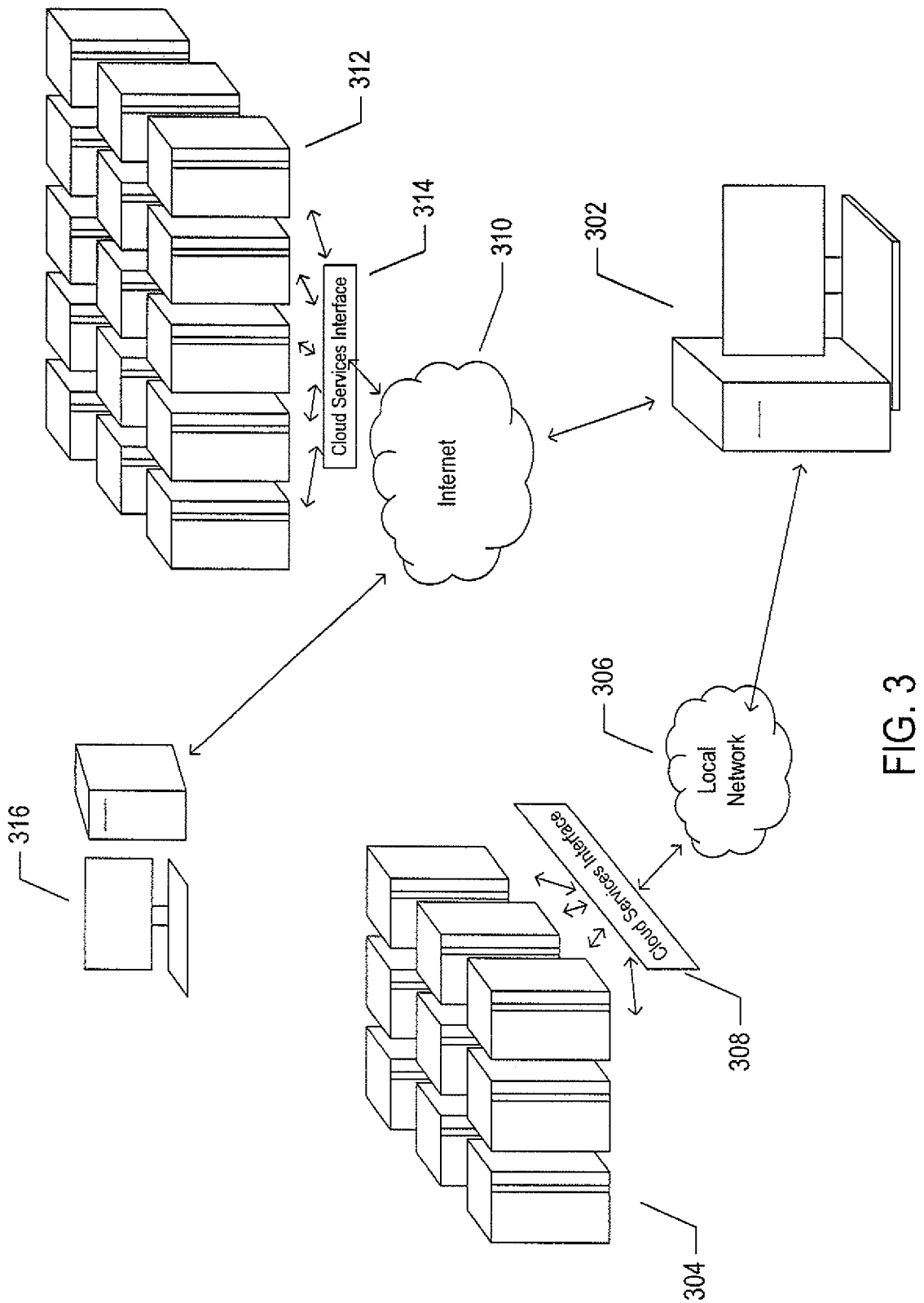
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 396 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
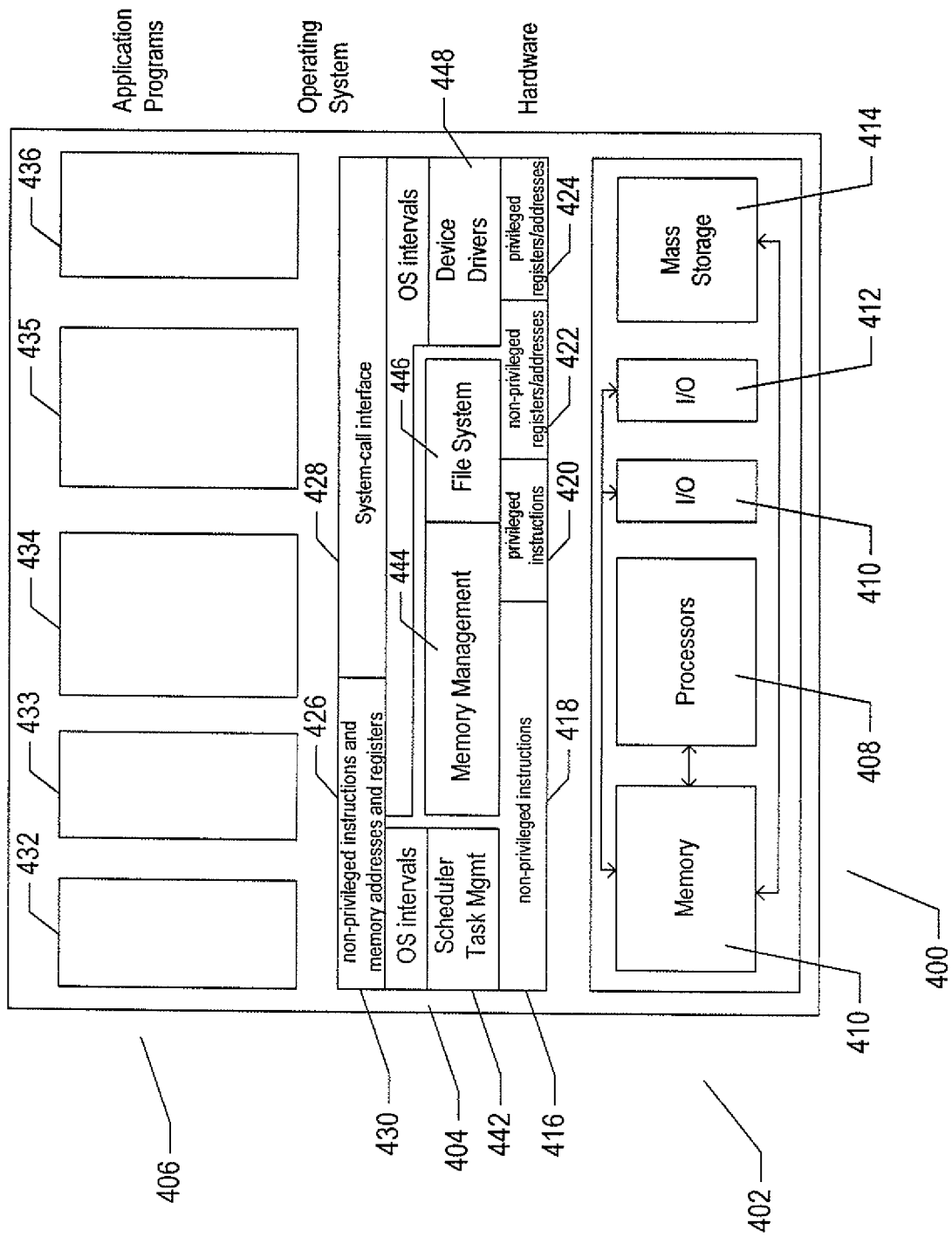
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
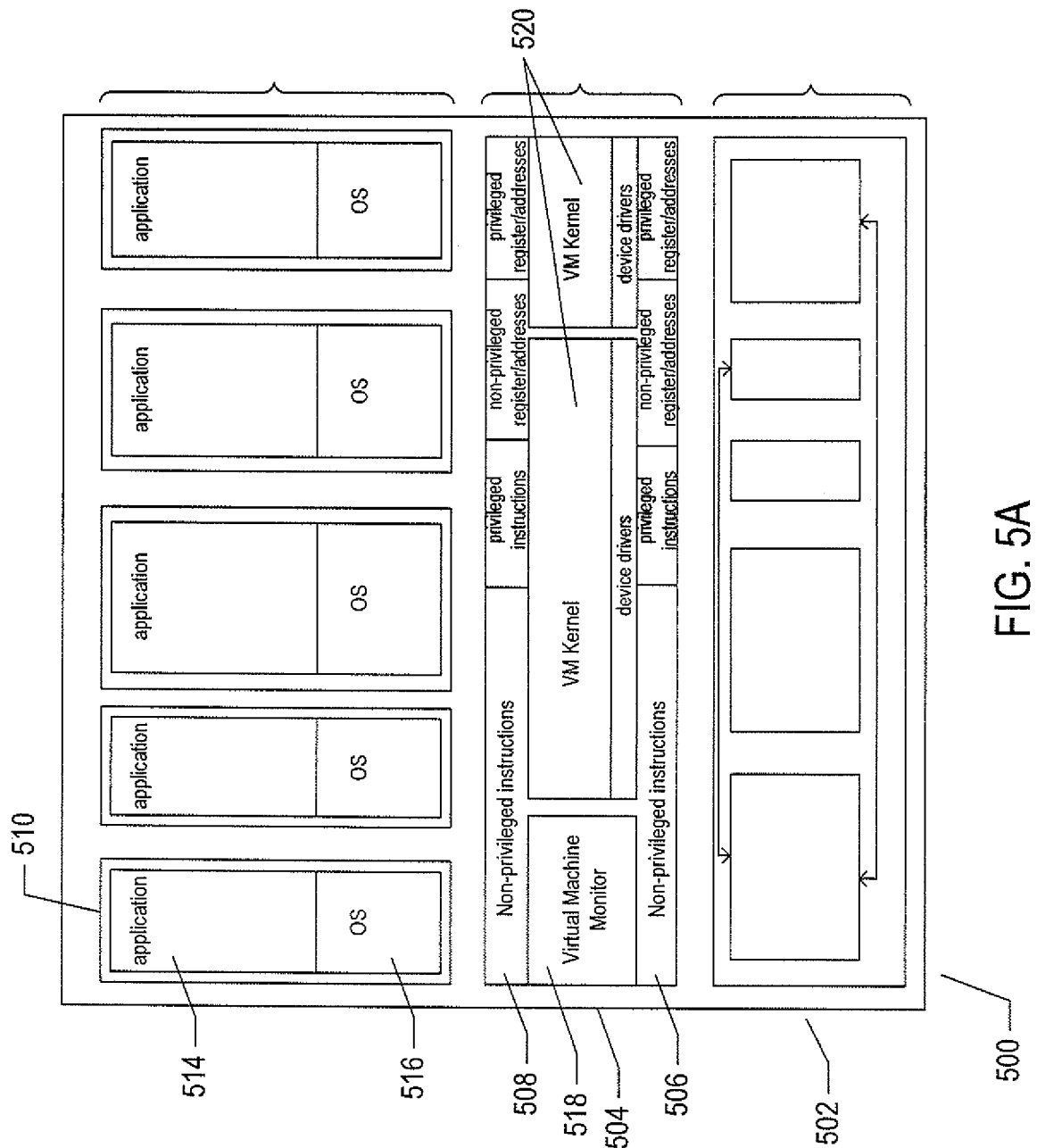
FIGS. 5A-B illustrate two types of virtual machine and virtual-machine execution environments.
Figure 5B:
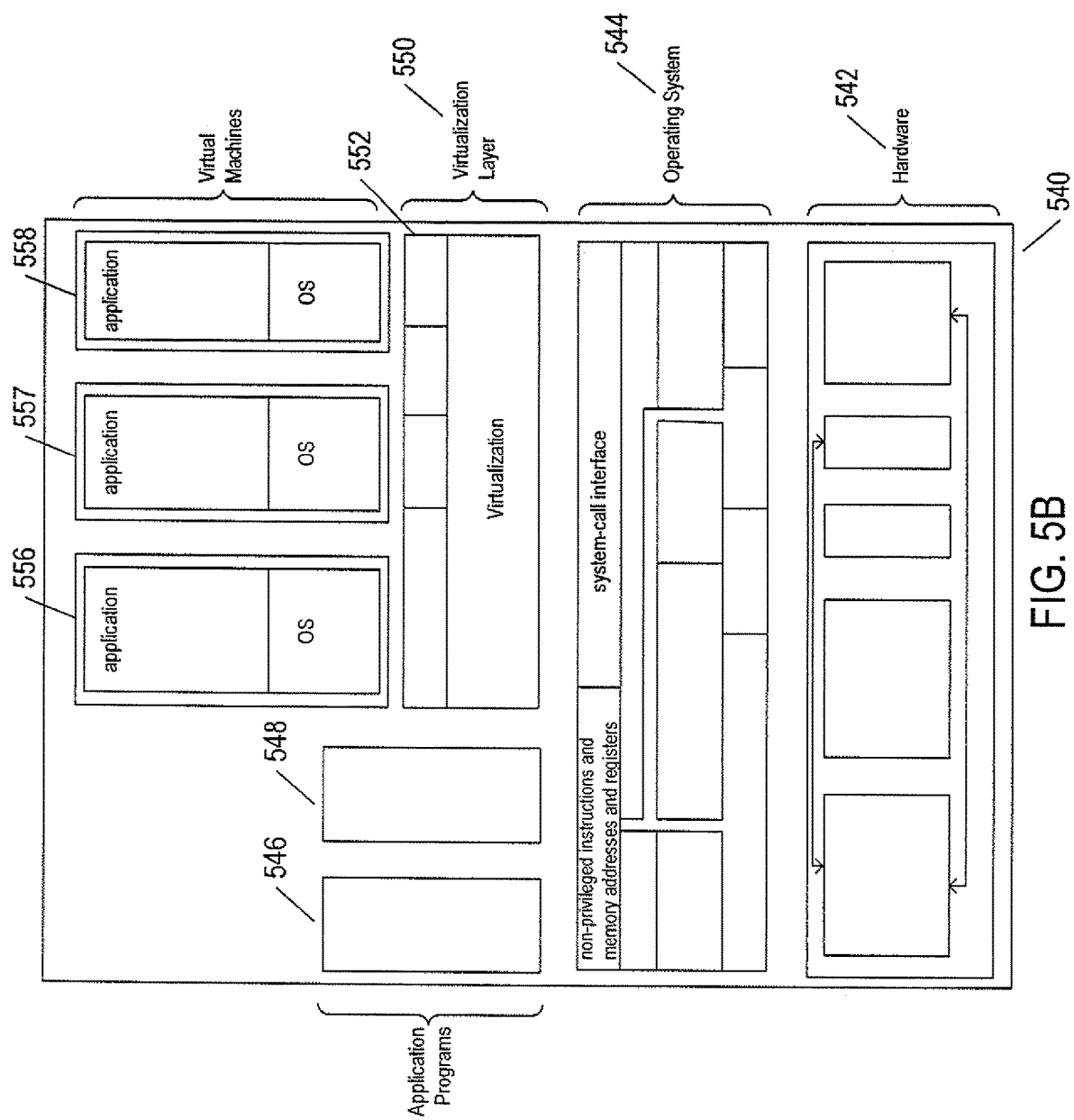

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
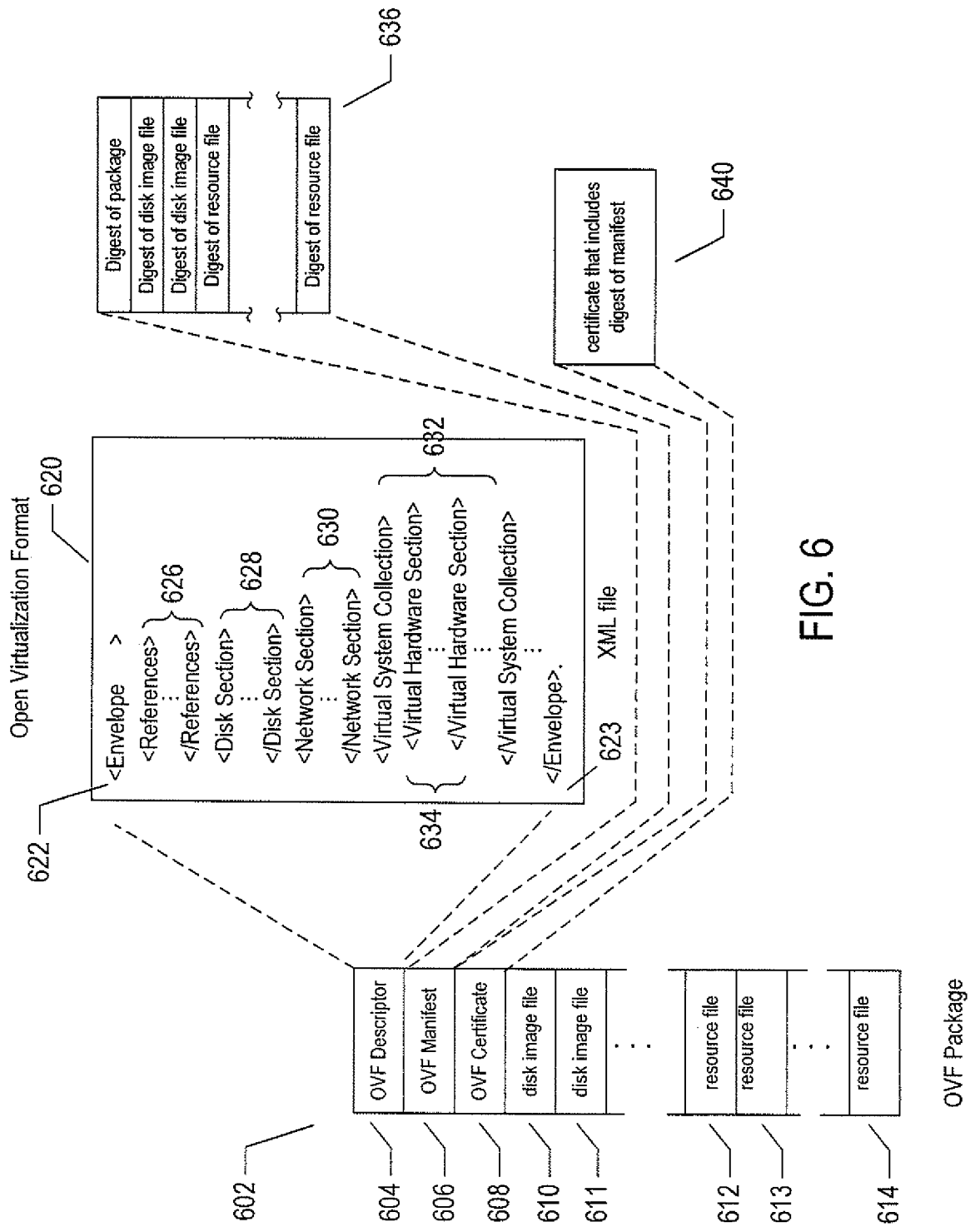
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
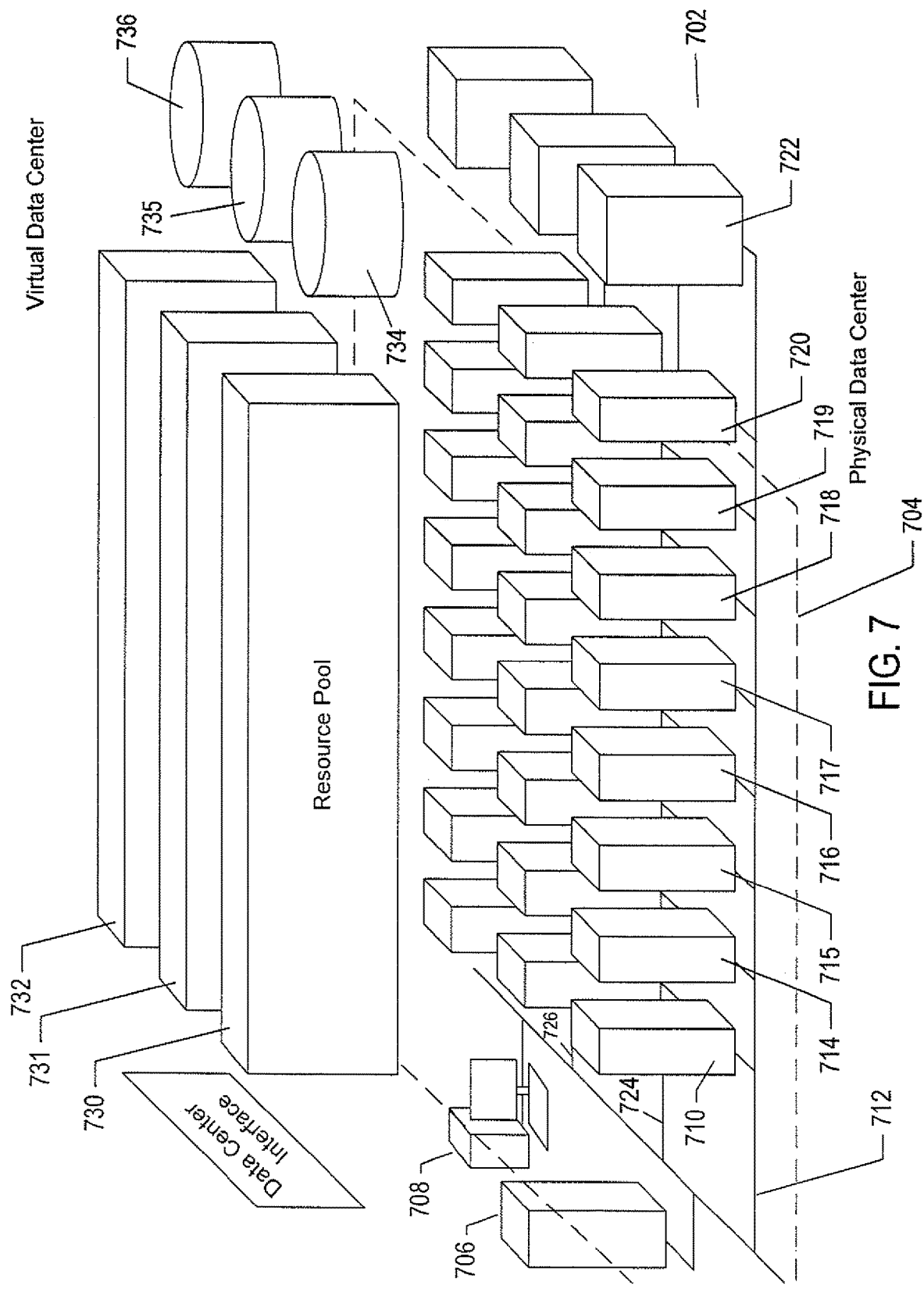
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
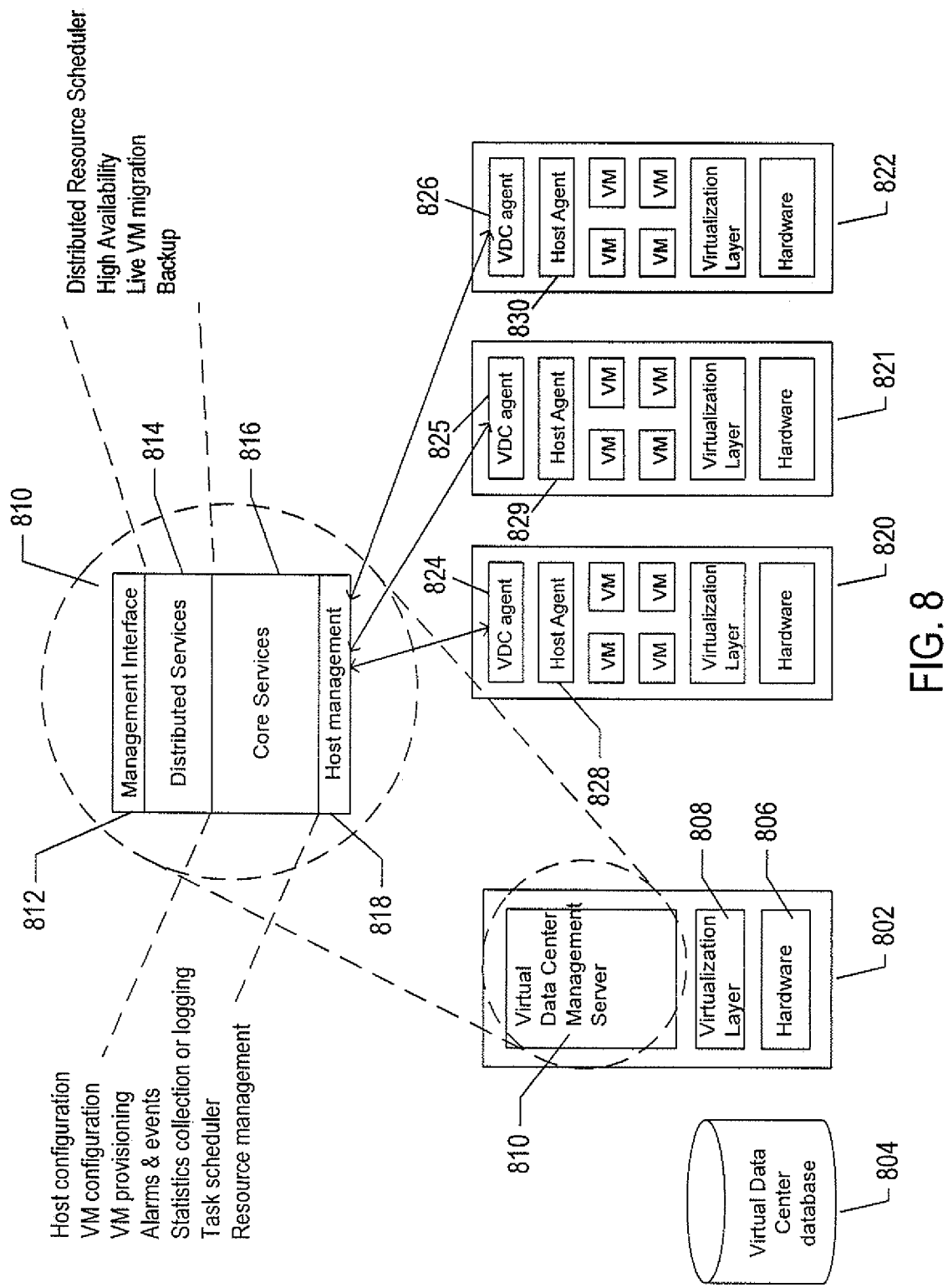
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
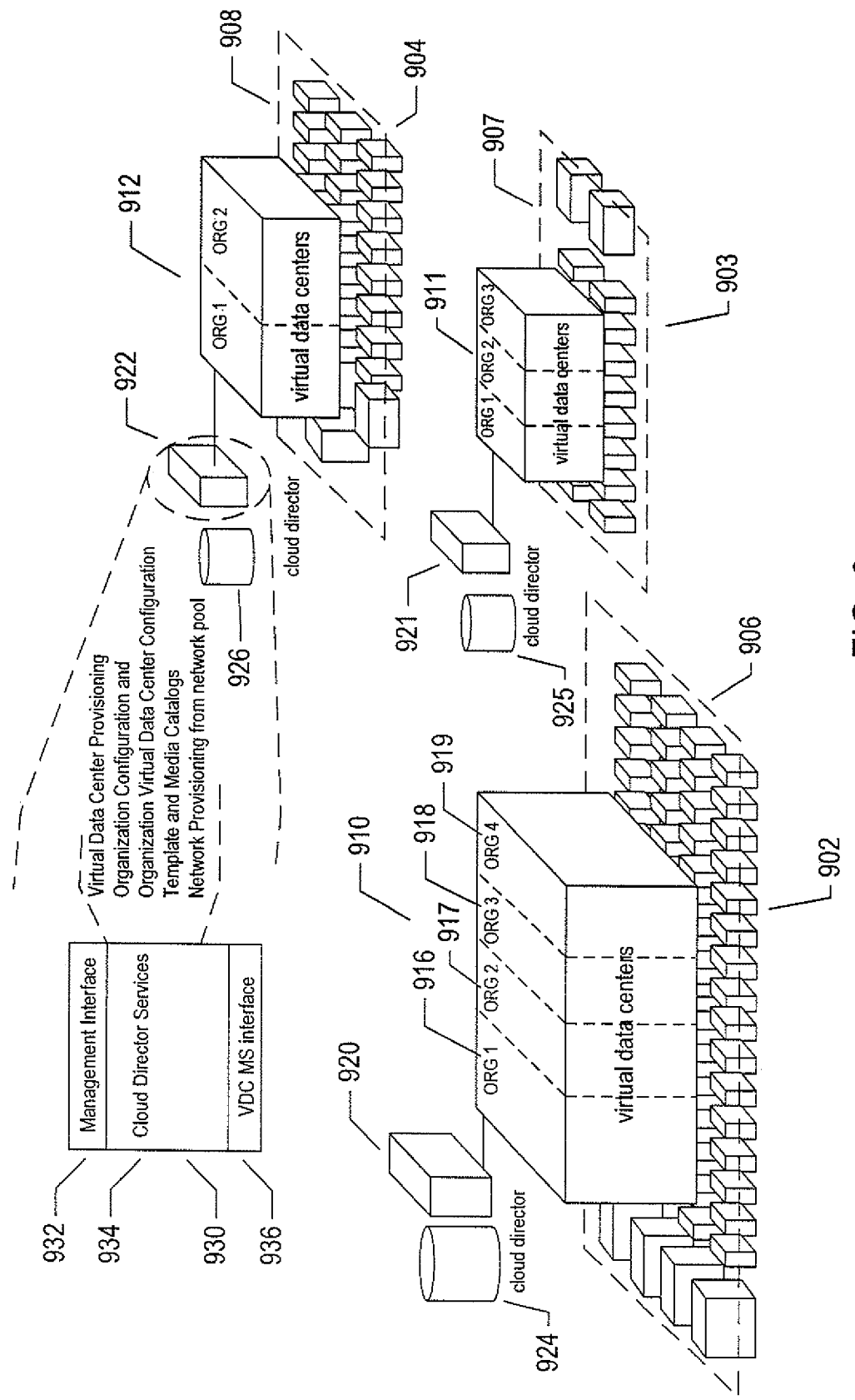
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
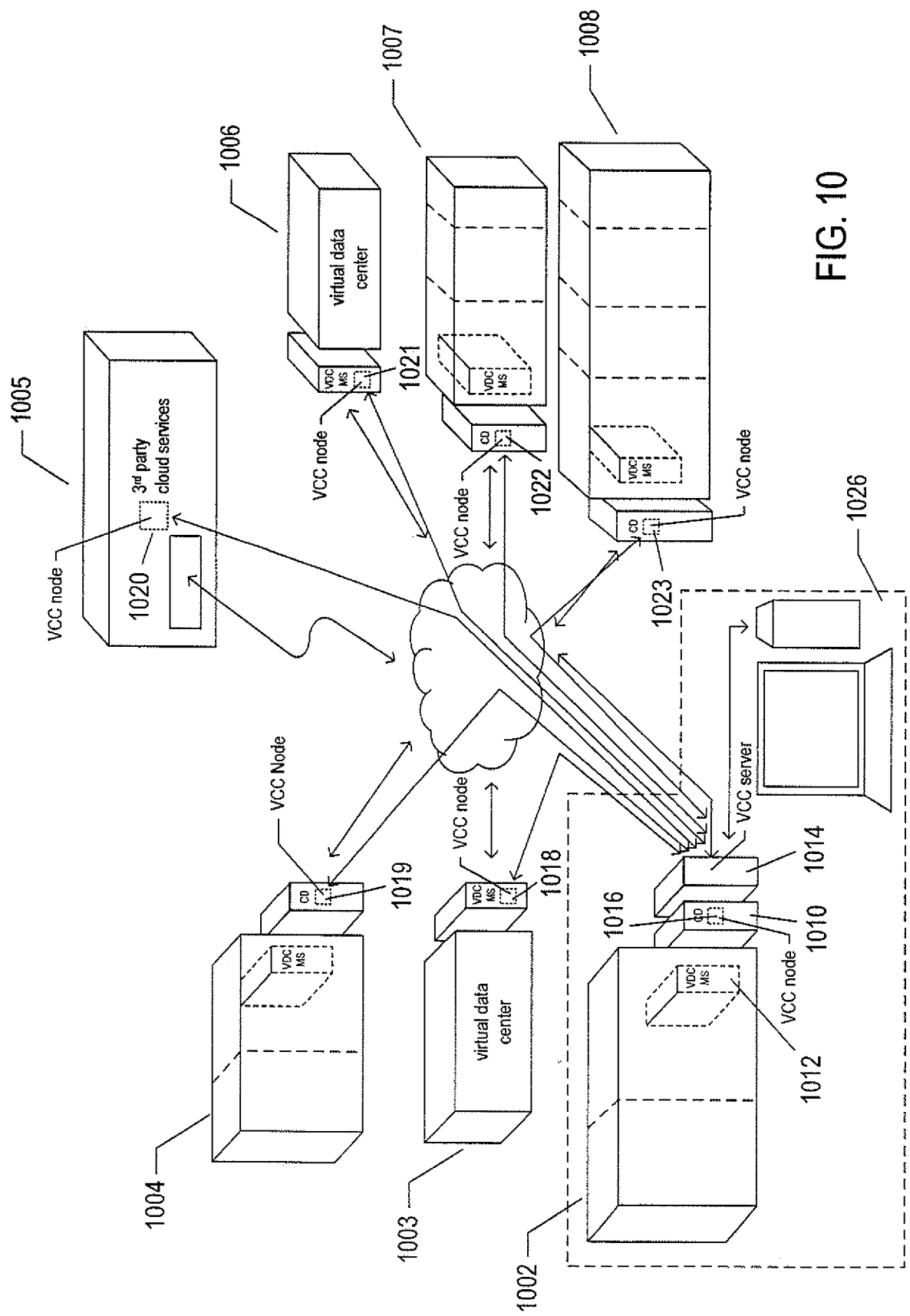
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

The Currently Disclosed Methods and Systems

Figure 11:
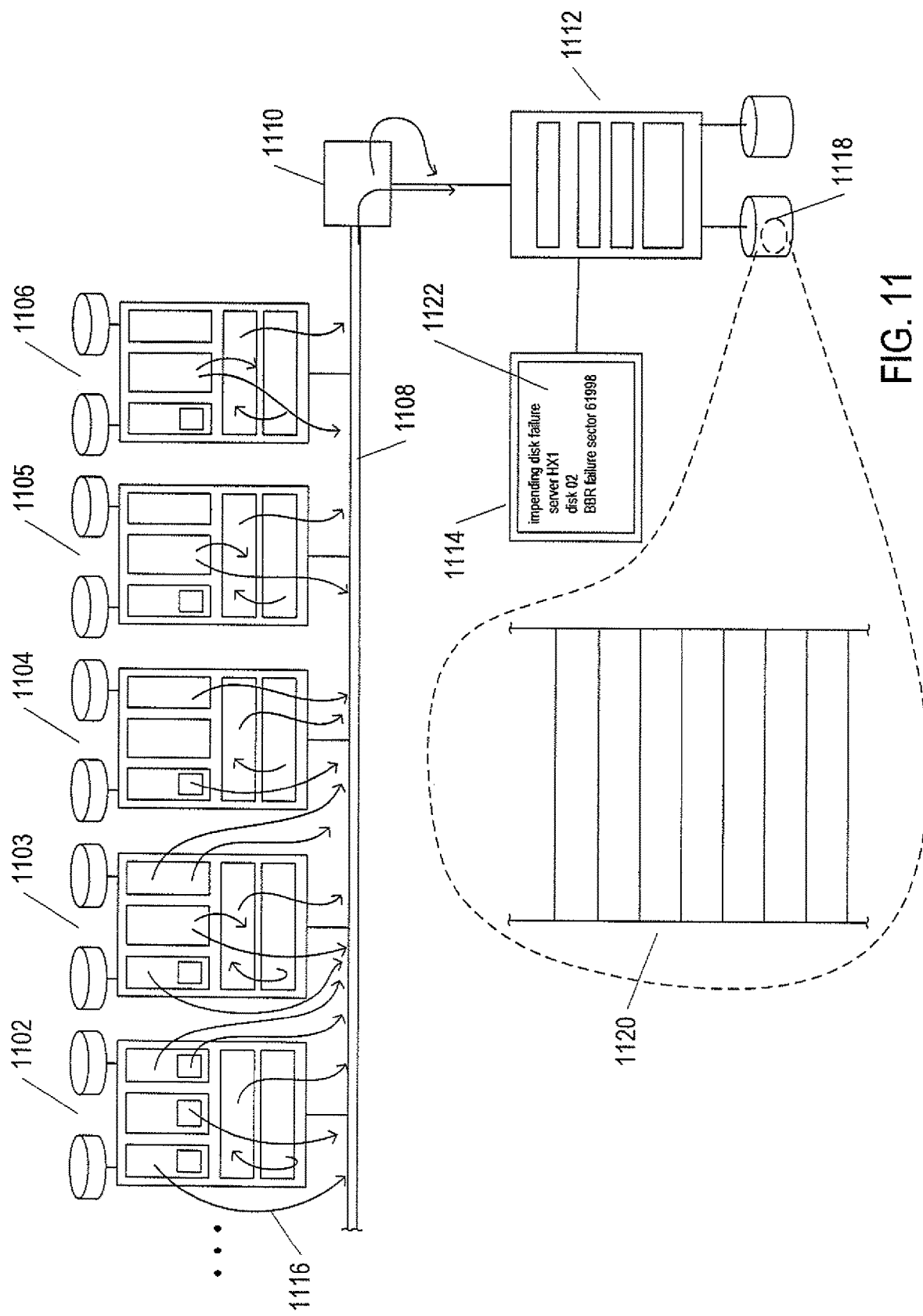
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

It should be noted that the phrase "log file" is not intended to mean only operating-system-provided data-storage files, but includes any of many different types of event-message sources. Although, in many cases, event messages are stored in files, they may be alternatively streamed from event-message sources to administrative computers and other event-message sinks within a distributed computer system, stored and transferred in shared memory and distributed shared memory, or stored on physical media that is physically transported from a source computer to a receiving computer. It is convenient, in the following discussion, to diagram and discuss log files as files of log entries that each corresponds to an event message, but, in fact, there are many different types of sources of log-file entries.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long-time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise.

Figure 13:
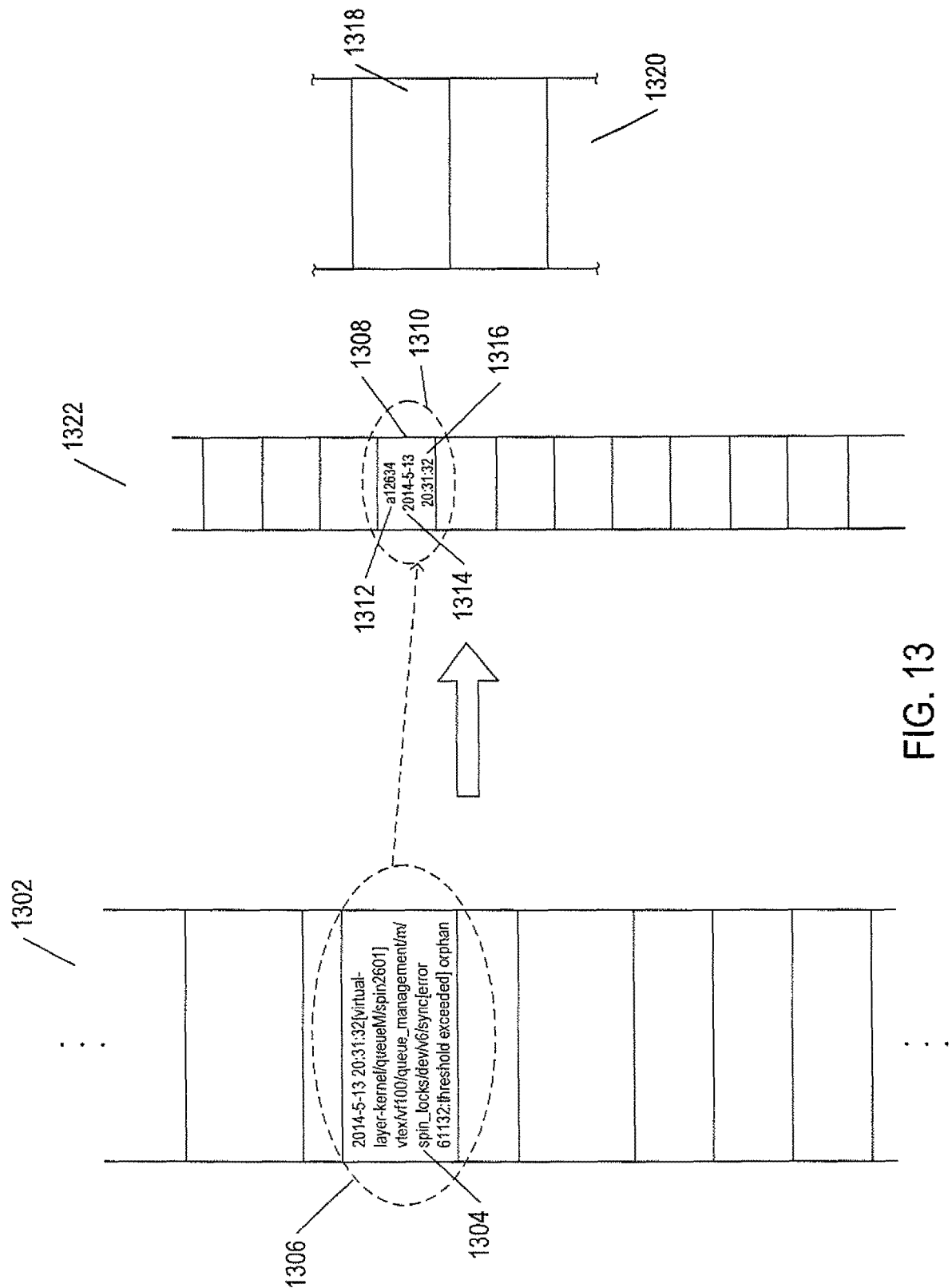
FIG. 13 illustrates the event-message-processing approach represented by the currently disclosed methods and systems.

FIG. 13 illustrates one event-message-processing method. In FIG. 13, a traditional event log 1302 is shown as a column of event messages, including the event message 1304 shown within inset 1306. The methods and systems to which the current document is directed automatically process event messages, as they are received, in order to transform the received event messages into event records, such as event record 1308 shown within inset 1310. The event record 1308 includes a numeric event-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a12634 (1312 in FIG. 13). Thus, event messages may be somewhat compressed and stored as event records in log files. Many other types of processing may be carried out to standardize and normalize event messages in order to produce log files with log entries having a uniform format. For the purposes of describing the virtual-log-file system, it is assumed that the physical log files within a distributed computer system include normalized log-file entries. When this is not the case, log-file entries ingested by the virtual-log-file system may be initially normalized and efficiently stored by the virtual-log-file system to facilitate virtual-log-file-system operations.

The event-record log, such as event-record log 1322, and other types of accumulations of event records have numerous advantages over a traditional event-message log. A first advantage is that each event record is typed. Because the event records are typed, the event-record log can be easily searched, partitioned, and otherwise processed based on event-message types, which produces a significant computational advantage for downstream event-analysis and event-interpretation systems. A second advantage is that, as shown in FIG. 13, event-record logs are significantly compressed with respect to traditional event-message logs. Because only one copy of the non-parameter portion of each type of event message needs to be stored in the associated table, a significant data compression is achieved by the methods and systems to which the current document is directed. The compression ratios achieved depend on the average ratio of non-parameter characters to parameter characters in event messages. In many cases, compression ratios of between 2:1 and 10:1 can be achieved by storing event records rather than event messages. Because terabytes of event messages may be collected on a daily basis within a large, distributed computing system, this potential rate of data compression represents a significant decrease in computational and hardware-usage overheads. A third advantage of event-record logs in comparison to event-message logs is that the event-record logs are fully and uniformly structured, which additionally facilitates downstream automated analysis and interpretation. The downstream analysis and interpretation systems directly acquire relevant parameters and an event type from an event record, without the need for parsing and typing a large variety of different types of event messages.

Figure 14A:
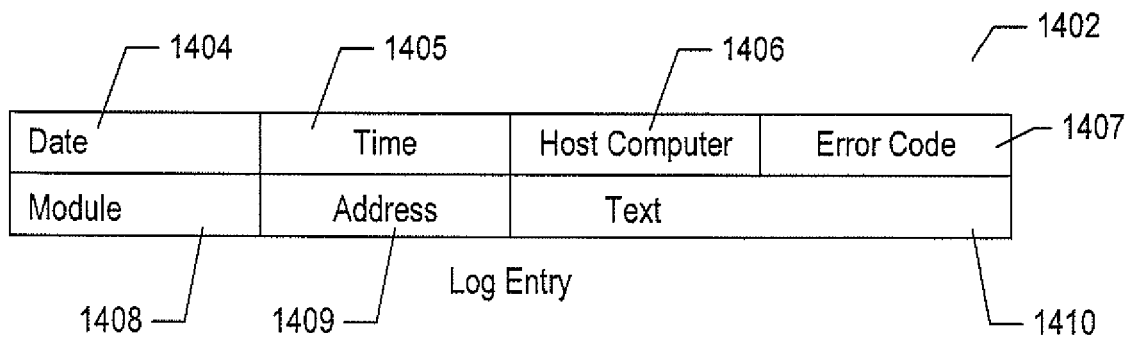
Figure 14B:
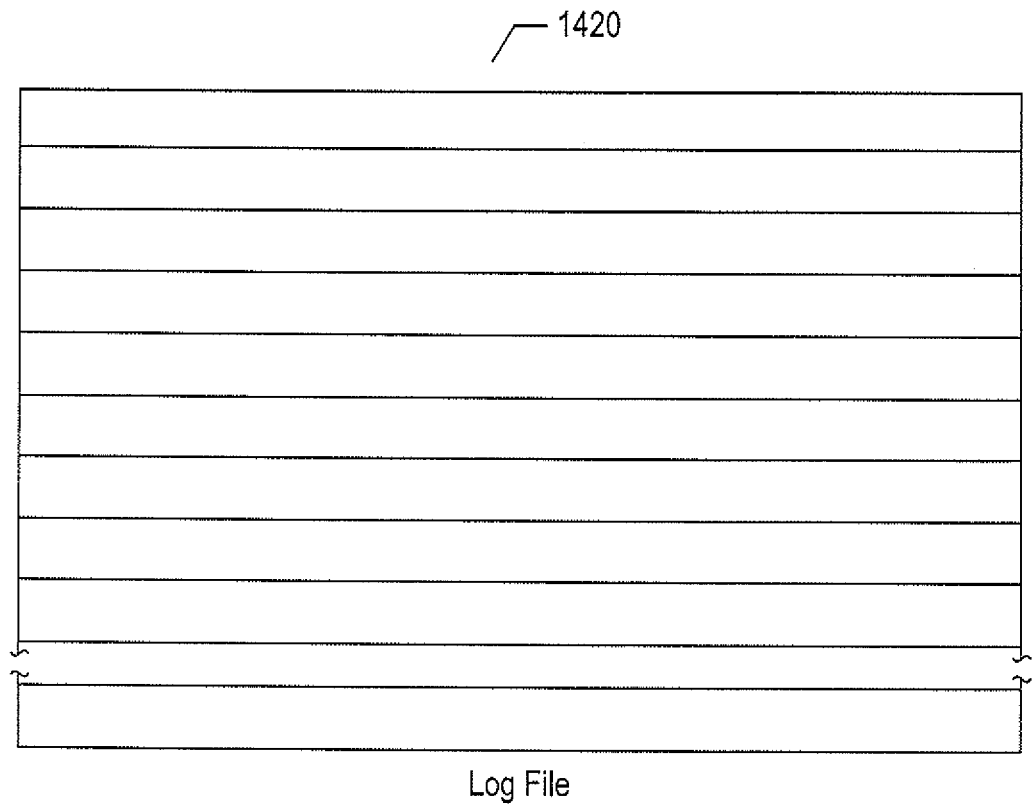

FIGS. 14A-C illustrate a simplified picture of log entries and log files that is used in the remaining discussion of the virtual-log-file system to which the current application is directed. As shown in FIG. 14A, log-file entries, such as entry 1402, are short alphanumeric records that include various different fields. These fields include a date 1404, a time 1405, an identifier for the host computer 1406 which generated the log entry, an error code, also referred to as an "event type" 1407, an identifier of the module that includes the executable instructions that generated the log entry 1408, an address of a point in the module where the executable instructions reside 1409, and a potentially lengthier text field that includes a description of the event, error, anomaly, or other occurrence represented by the log entry 1410. There may be many additional fields in actual log entries stored in log files of different types of computer systems. Log-file entries may have various different formats, encodings, field orders, natural languages, and other differences. In many cases, the log entries collected within log files of a distributed computer system are somewhat standardized based on the operating systems, virtualization layers, and types of application programs running within the distributed system. As discussed above, additional standardization and normalization may occur during processing of error messages input to a logging subsystem within computer systems and components of computer systems and may be carried out by the virtual-log-file system to which the current application is directed when ingesting log entries from physical log files.

As shown in FIG. 14B, a physical log file 1420 can be thought of as a stored sequence of log entries. Any of many different types of files and file structures can be used for log files. Log files may be simple, flat files containing unstructured text that is processed, during file-access operations, into arrays or streams of log entries. Alternatively, log entries may be records within structured files. While traditional random-access files are conveniently used for storing log entries, log files may also be stored on underlying physical media that can be only sequentially read and processed. However, in all cases, standardized physical-log-file-access interfaces can be developed to provide logical physical log files that each consists of a sequence of standardized log entries, as shown in FIGS. 14A-B.

As shown in FIG. 14C, physical log files and, in certain cases, archived log files are generally distributed throughout a large distributed computer system. In FIG. 14C, the distributed computer system 1402 includes eight different discrete computer systems 1404-1411, a stand-alone archive of log-file entries 1412, and numerous log files, such as log file 1420 in discrete computer system 1404 and archived log files, such as archived log files 1422 contained within, or accessed from, discrete computer system 1410. In fact, in many large distributed computing systems, there may be hundreds, thousands, or more discrete computer systems and processor-controlled devices and tens of hundreds to many tens of thousands or more individual sources for log-file entries stored within thousands of log files distributed throughout the components of the distributed computer system.

Figure 15:
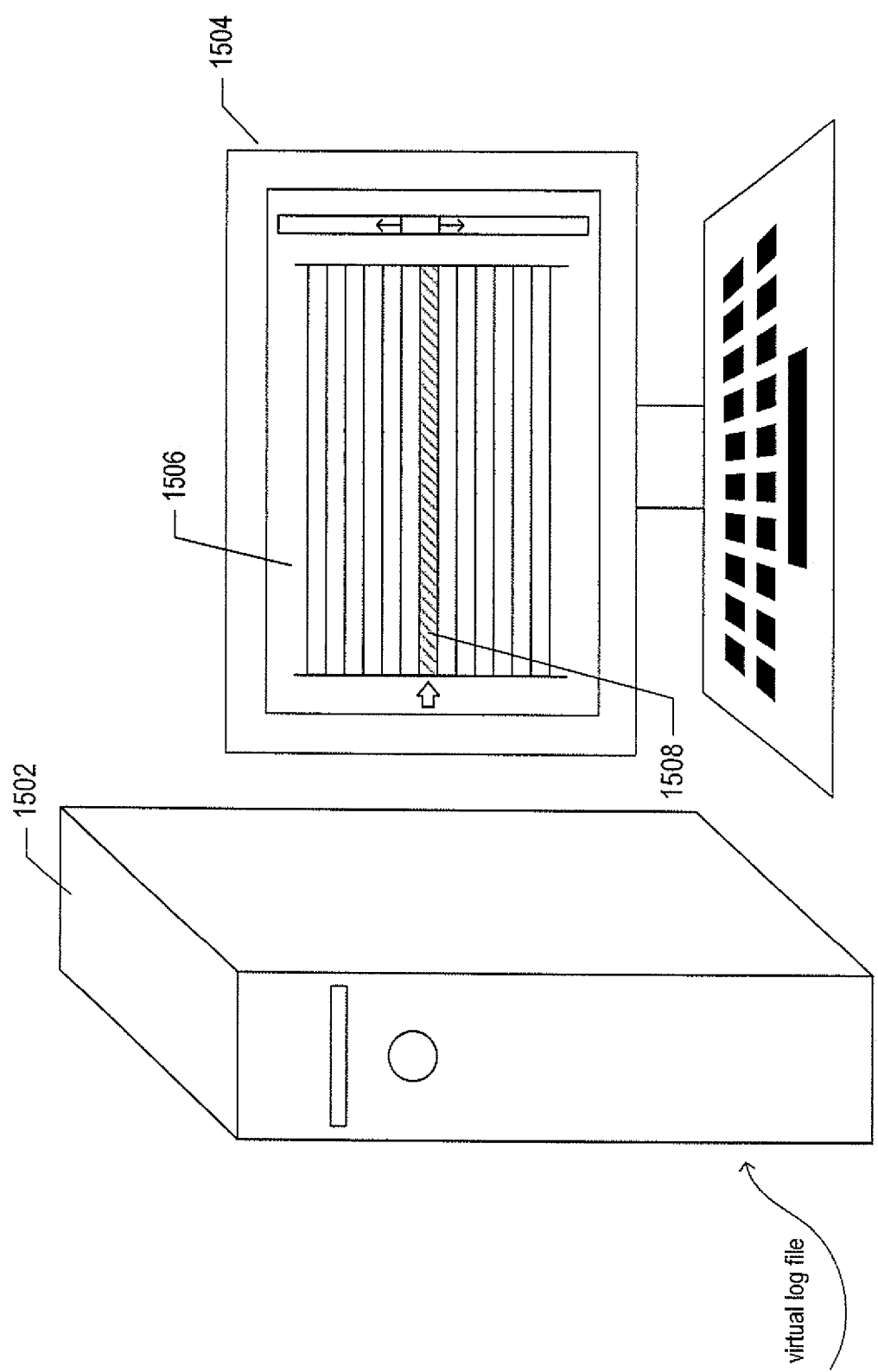
FIG. 15 shows a log-file analysis system that may be used, by a system administrator or other personnel responsible for configuring and maintaining a distributed computing system, to view the contents of the many logs files that may be stored and continuously updated within a distributed computing system.

FIG. 15 shows a log-file analysis system that may be used, by a system administrator or other personnel responsible for configuring and maintaining a distributed computing system, to view the contents of the many logs files that may be stored and continuously updated within a distributed computing system. The contents of the many different log files may be merged together, by merge/sort operations, to produce a virtual log file that is accessed by a log-file-analytics application running on a local computer 1502. The log-analytics application displays, on a user display device 1504, a browser-like user interface 1506 that shows, at any given time, a small portion of the log entries, such as log entry 1508, present within the virtual log file. In addition, the log-analytics application may provide for numerous different types of computational analysis and processing of log-file entries in order to generate a variety of different statistics, graphical representations of the contents of log files, and other information. In many cases, either the log-analytics system, or monitoring subsystems of the distributed computing system, may monitor the contents of the log files within a distributed computing system in order to detect anomalous situations, indications of potential problems, and other such occurrences and automatically generate alarms and warning notifications to automated failure-detection and amelioration subsystems as well as to human administrators and other personnel.

The current document is directed to methods that are incorporated within automated monitoring subsystems, log-analysis systems, and other systems and subsystems in order to detect distributed-computing-system state changes, indications of potential problems and failures, and other problem-associated conditions based on the contents of log files. In general, the analysis of log-file entries to detect such occurrences is fraught with complexities and difficulties. In many large distributed computing systems, terabytes of log-file data are generated on a daily basis. There may be thousands, tens of thousands, or more different types of recorded events within log files, and thousands, tens of thousands, or more occurrences of any particular type of event within the log files generated on an hourly or daily basis. In many approaches to the analysis of log-file entries, various types of graph-based methods may be applied to recognize patterns and trends within the voluminous and noisy log-file data. Naïve approaches may rely on detecting particular types of log entries, such as log entries associated with urgent or critical statuses. However, such naïve methods often fail to detect impending problems until the problems have reached a level of seriousness and pervasiveness that amelioration of the problems may involve significant temporal overheads, computational burdens, down time, and large-scale hardware-component substitutions and replacements. The current document is directed, in part, to methods, incorporated within automated subsystems and log-analytics systems, that rely on recognizing impending failures, problems, and anomalous conditions based on aggregate properties of log-file-entry subsets.

Figure 16A:
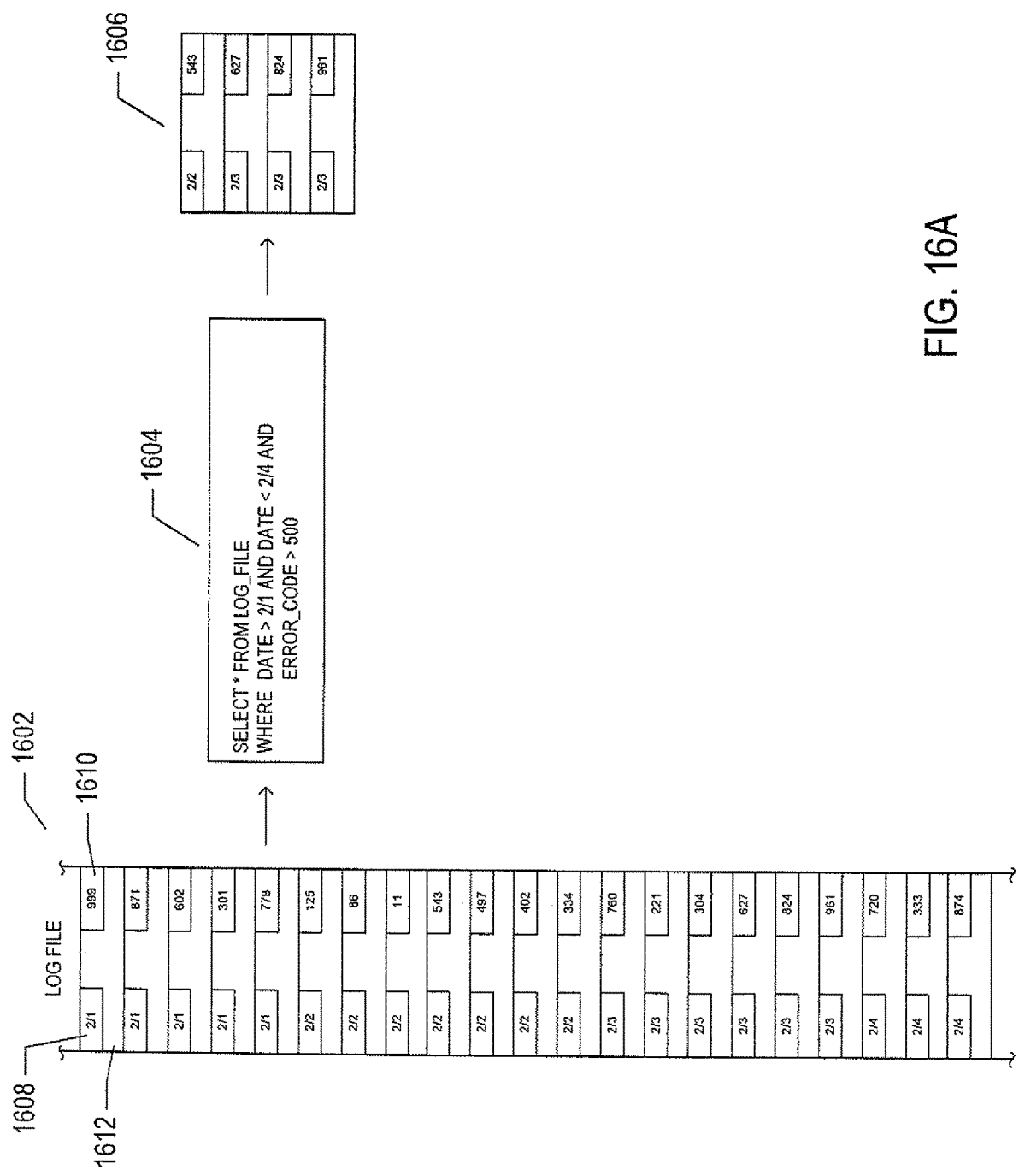
FIGS. 16A-B illustrate generation of event distributions from log-file entries.
Figure 16B:
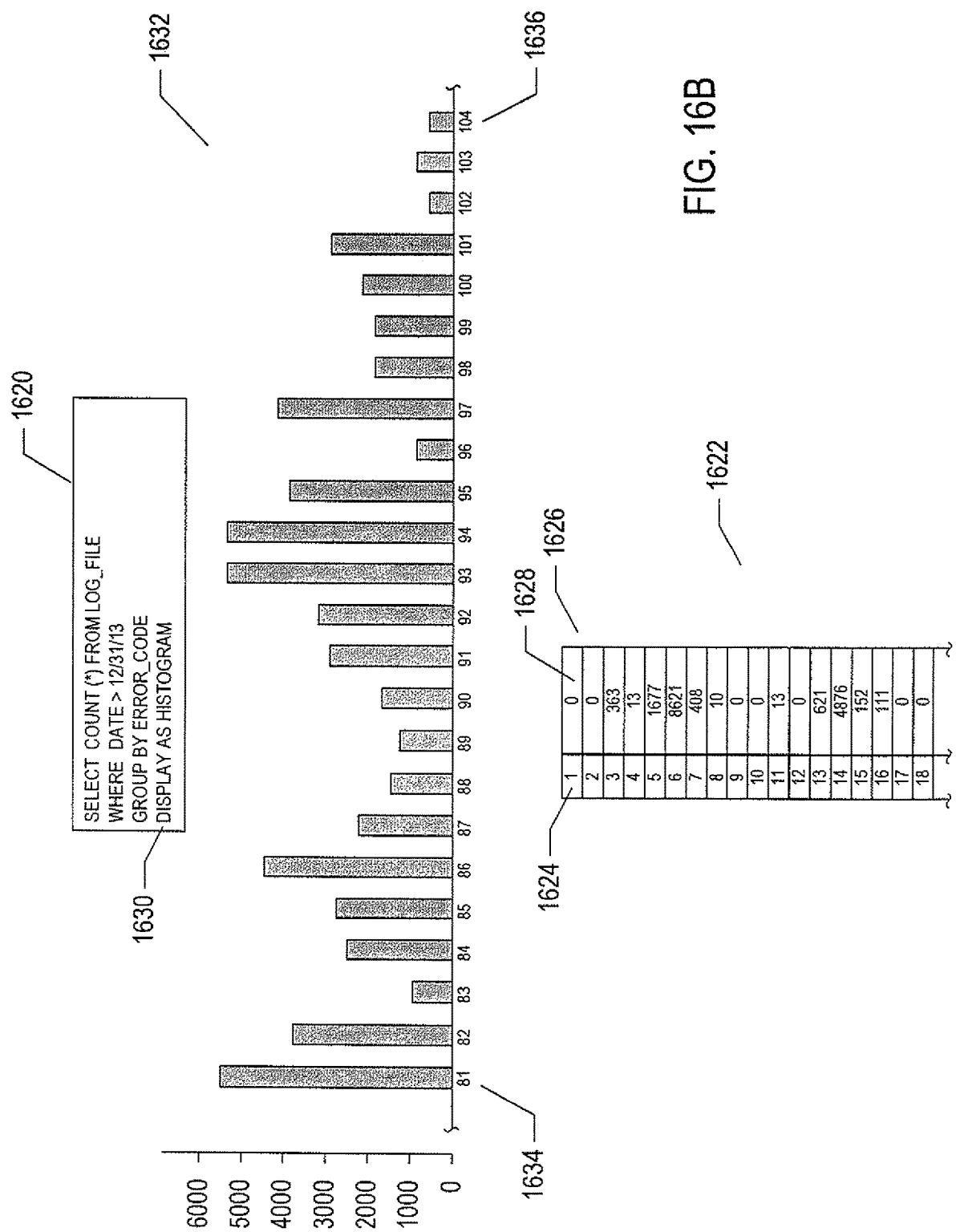

FIGS. 16A-B illustrate generation of event distributions from log-file entries. As shown in FIG. 16A, a log file 1602, such as an individual log file or a virtual log file that represents the contents of many individual log files within a distributed computing system, may be treated as a database of log-file entries. Queries, such as query 1604, may be executed against the contents of a log file or virtual log file to produce a subset 1606 of log-file entries that correspond to the constraints specified in the query. Another way of looking at the query-execution process is that the query 1604 operates as a filter to select, or accept, only a subset 1606 of the total number of entries within a log file or virtual log file 1602. In the example shown in FIG. 16A, the query 1604 is shown in a structured-query-language ("SQL") form, as commonly used in relational-database queries. In the simple example shown in FIG. 16A, the date and error_code fields of simplified log entries are shown with example values, such as the date field containing the date "2/1" 1608 and the error_code field containing the error code "999" 1610 in log-file entry 1612. Query 1604 selects, from the log file, those entries for which the date field is greater than 2/1 and less than 2/4 and for which the error_code field has a value greater than 500. Of the log-file entries displayed in the portion of the log-file shown in FIG. 16A, only the four entries in the subset of log-file entry 1606 meet the constraints of the query 1604.

As shown in FIG. 16B, a query 1620 can be used to select the number of log-file entries for each different possible error code. The result of the query can be viewed as a table 1622, each row of which contains the indication of an error code, such as the error code "1" 1624 in the first row 1626 of the table, and a field containing the count of the number of log-file entries with that error code, such as the count "0" 1628 in the first row 1626 of the table 1622. Query 1620 also includes a directive 1630 "DISPLAY AS HISTOGRAM." This results, in one implementation, in the display of a histogram-like plot 1632 of the number of log-file entries for each of the possible error codes. Only a portion of the plot is shown in FIG. 16B that includes vertical-bar representations of the counts of the error codes from "81" 1634 to "104" 1636.

A histogram, such as histogram 1632, or a table of counts for the different error codes, such as table 1622, are readily converted into probability distributions. The count for any particular error code divided by the total counts for all of the error codes is the probability that a log-file entry with that error code would be selected at random from the entries within the log file from which the histogram or table is generated. The sum of all of the probabilities for the different error codes is 1.0, consistent with the definition of a discrete probability distribution. Thus, a SELECT query with a "GROUP BY ERROR CODE" clause provides the raw data for generation of a distribution of error_code types within all or a defined subset of the entries of a log file or virtual log file.

Queries, such as query 1620 in FIG. 16B, can be used to select counts for the different types of events or error codes within log-file entries that represent various subsets of log-file entries available for analysis. In many cases, the subsets of log-file entries are obtained by query logic that selects a subset of queries created or received during a particular time interval. However, in other cases, the subsets may be alternatively specified. As one example, a subset may include log-file entries generated by a particular computer system or a particular subsystem within a particular computer system. Furthermore, the queries may be further restricted to select counts for only a subset of all of the possible event types or error codes. In certain cases, discussed below, the probability distributions generated from such queries provide a type of fingerprint or snapshot of the state of a log file or log files for particular intervals in time. By comparing these distributions, changes in the state of the log files, which reflect changes in the state of a distributed system, can be detected between different periods of time. In other cases, the distributions may serve as fingerprints for particular computer systems, for particular types of operational characteristics or behaviors, and for essentially any arbitrary conditions, time intervals, localities, or other phenomenon on the basis of which the subsets of log-file entries from which the probability distributions were specified. In other words, comparing the probability distributions generated from the results of two queries carried out on a large set of available log-file-entries provides insight as to the similarity or dissimilarity between characteristics of the subsets of log-file-entries specified in the queries.

Figure 17A:
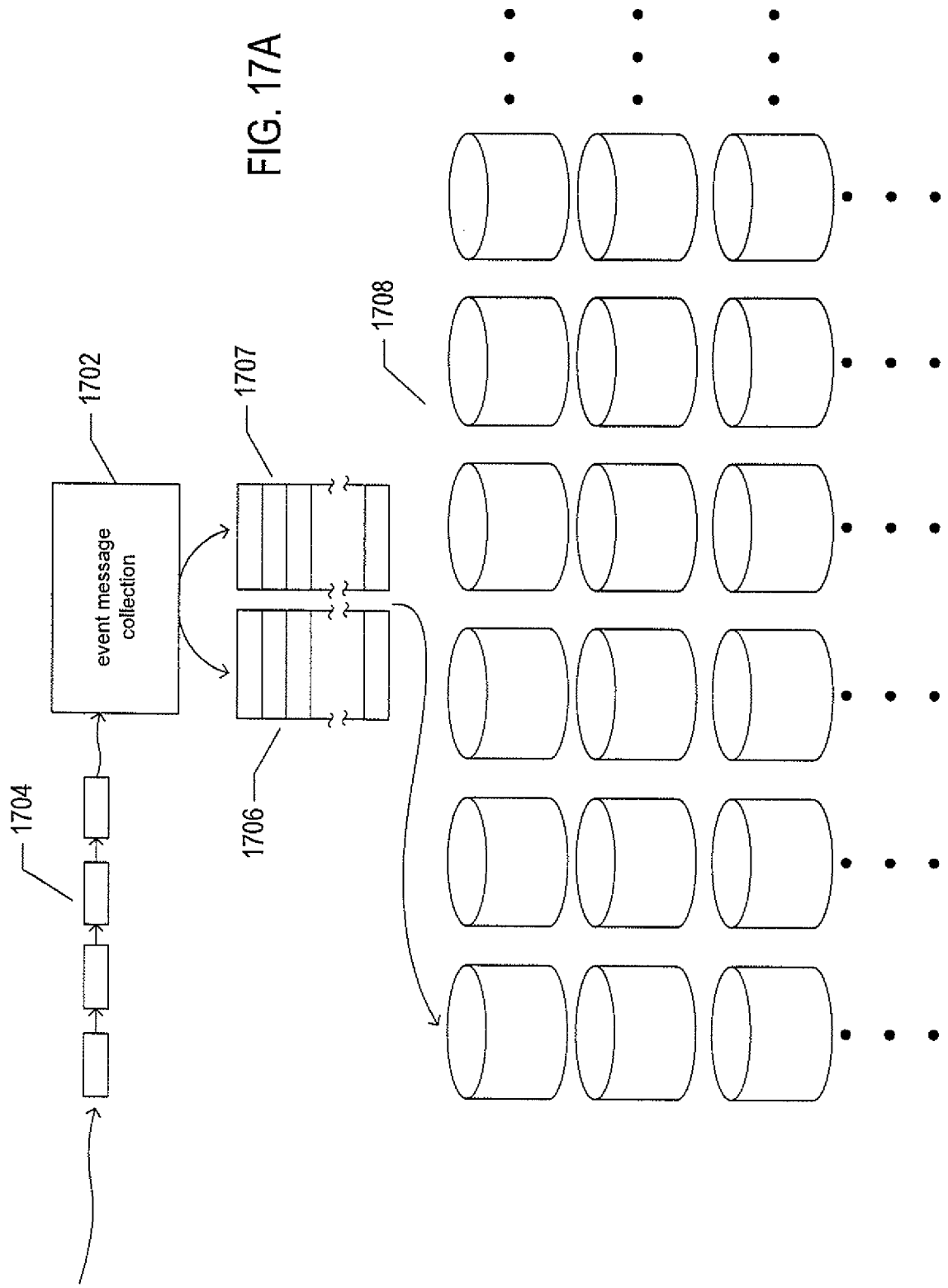
FIGS. 17A-C illustrate certain data-storage issues encountered by query-processing subsystems that execute queries against log-file entries stored in files or other types containers within a distributed computing system.
Figure 17B:
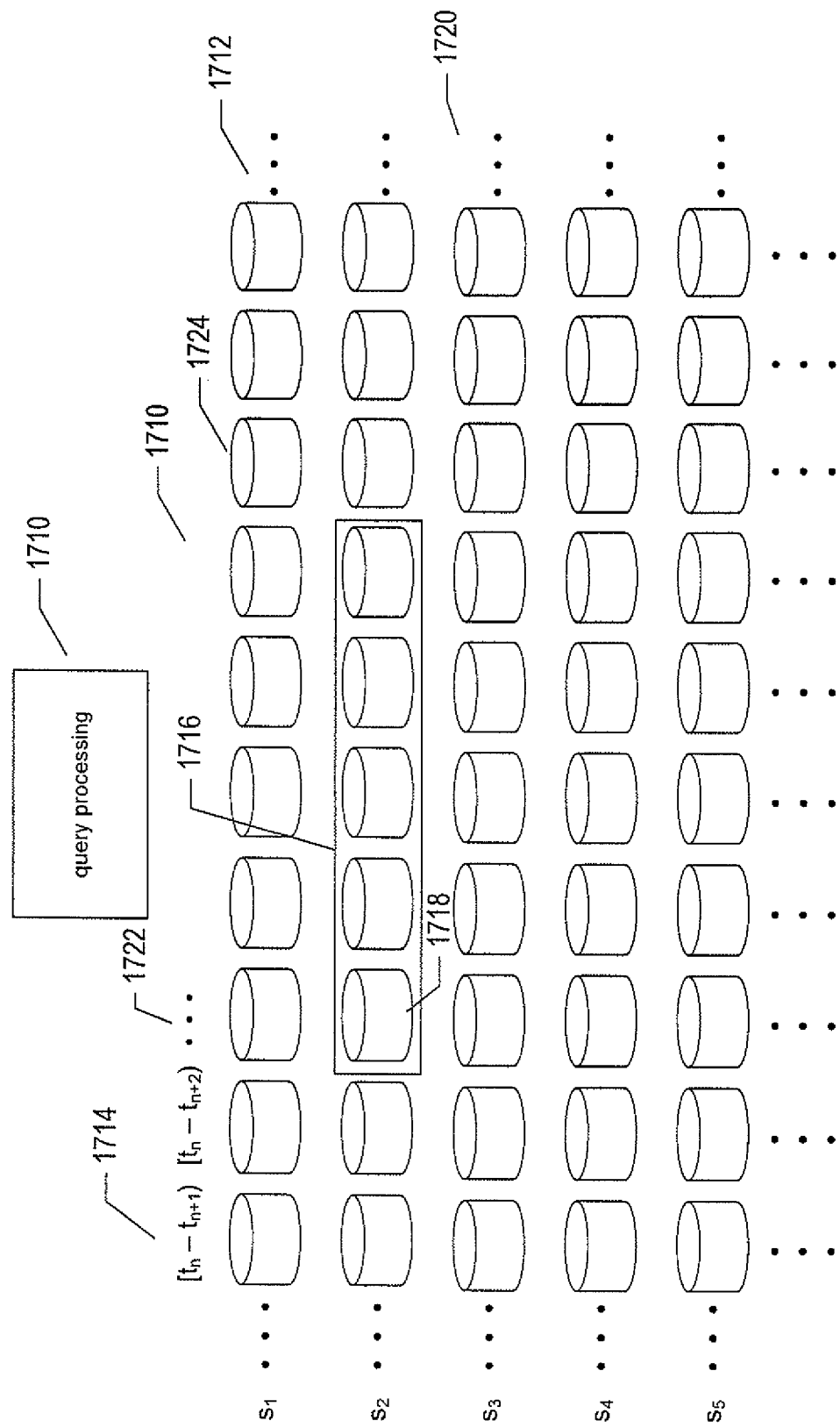
Figure 17C:
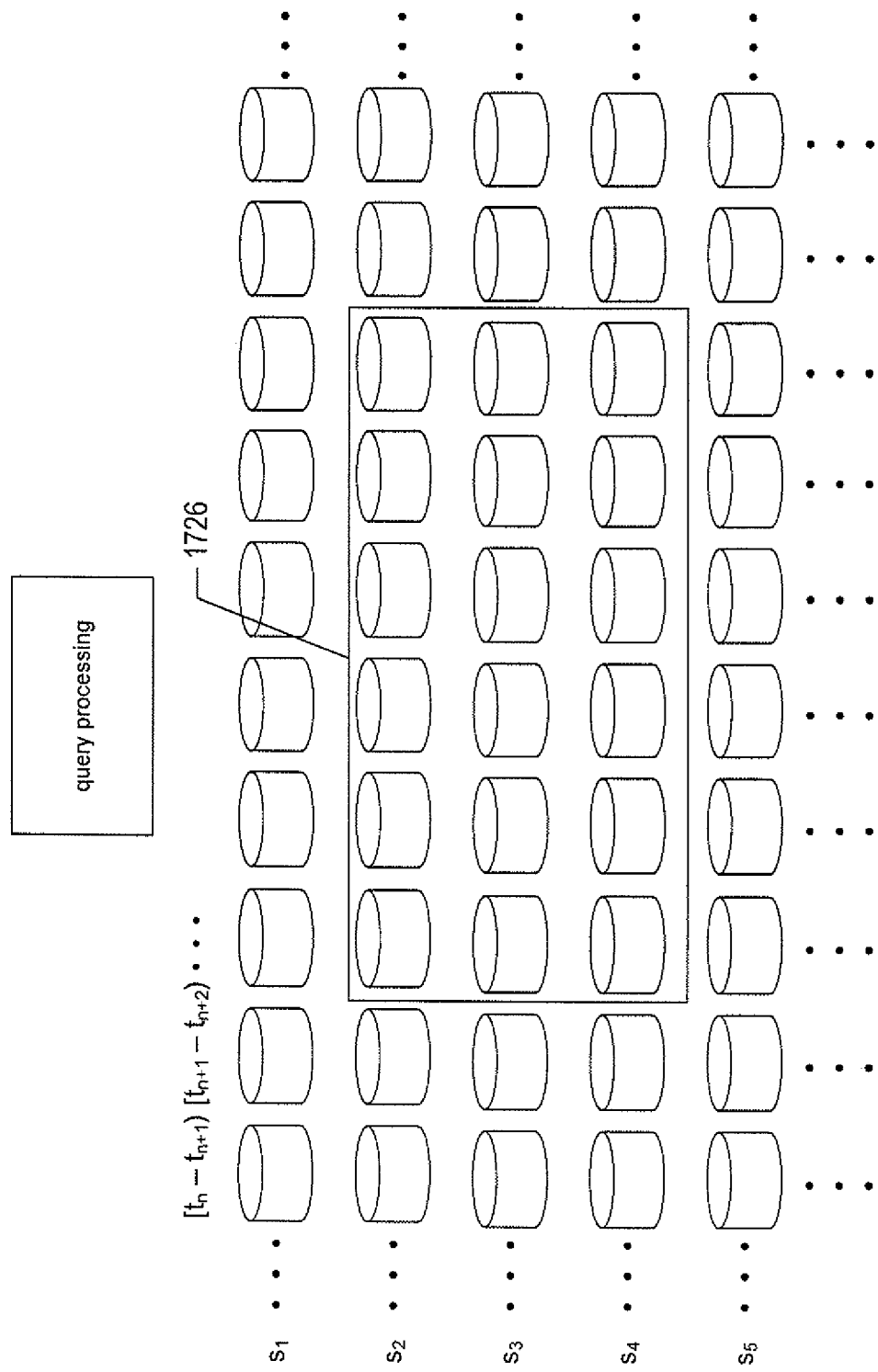

The current document is directed to efficient query processing by a query-processing subsystem within a distributed computing system. FIGS. 17A-C illustrate certain data-storage issues encountered by query-processing subsystems that execute queries against log-file entries stored in files or other types containers within a distributed computing system. As shown in FIG. 17A, an event-message-collection subsystem 1702 within a distributed computer system receives event messages 1704 from a variety of different event-message sources within a distributed-computing-system, as discussed above, processes the event messages to generate log-file entries, as also discussed above, and stores the generated log-file entries in open containers 1706 and 1707. These open containers may be memory-resident log files, containers associated with memory buffers that asynchronously transfer log-file entries from memory to mass-storage devices while the event-message-collection subsystem writes newly generated log-file entries to the memory buffers, traditional operating-system files, or other types of containers. At regular intervals, as the amount of data stored in the open containers reaches a threshold amount, the containers are closed and added to a large number of closed containers 1708 maintained in mass storage, and new containers are opened for storing subsequently generated log-file entries. Over time, enormous volumes of stored log-file entries in large numbers of containers are accumulated, and it is against this accumulated data that the query-processing subsystem executes queries.

FIGS. 17B-C illustrate access to stored data by a query-processing subsystem that executes queries against log-file entries. In the examples shown in FIGS. 17B-C, the closed containers that store log-file entries collected by an event-message-collection subsystem are arranged, as shown in FIG. 17B, in a two-dimensional matrix 1710 in which rows, such as row 1712, represent log-file entries obtained from a particular event-message source or a particular set of event-message sources and each column, such as column 1714, represent containers containing log-file entries generated and/or collected and processed within a particular time window. There are, of course, many different possible organizations for containers storing log-file entries and for the assignment of particular log-file entries to particular containers, with the approach illustrated in FIG. 17B being one possible approach that is used as an example in the current discussion. In FIG. 17B, a rectangle 1716 encloses five containers, including container 1718, in the second row 1720 of the two-dimensional matrix of containers corresponding to an event-message source, or set of event-message sources, $S_2$. This is an example of a set of containers that may be accessed by the query-processing system 1710 in order to execute a particular query with query parameters that specify log-file entries obtained from event messages received from the source or set of sources $S_2$ and received during a time period represented by the five columns beginning with column 1722 and ending with column 1724. The query in this example is quite narrowly constrained with respect to event-message sources and time, as a result of which the query-processing subsystem needs only to open and process the file entries stored in the five containers enclosed by rectangle 1716 in FIG. 17B. By contrast, a different query, execution of which is illustrated in FIG. 17C, accesses 18 containers, enclosed within rectangle 1726, specified by a slightly longer time represented by 6 columns of containers in the two-dimensional container matrix and containing event messages from one or more sources, or sets of sources, $S_2$, $S_3$, and $S_4$. The number of containers needed to be opened and processed by the query-processing subsystem can grow exponentially as the parameters associated with the query provide fewer and more broadly posed constraints on the relevant time window and the relevant event-message sources. Similar exponential growth occurs for other types of container organizations and specified event-message affinities for containers. For relatively unconstrained queries executed against the log-file entries stored within a large distributed computing system, a query-processing subsystem may need open, and process each log-file entry in, hundreds, thousands, or more containers in order to compile and return requested query results. This can be a very inefficient operation. For example, the parameters that define a query may specify a relatively long relevant time period, may be relatively unconstrained as for as the event-message sources relevant to the query, but may be tightly constrained to only one or a few different event-message types. In this case, many of the containers that fall within the specified time-period and event-message-source constraints may not include any log-file entries of the one or a few relevant event-message types, particularly in the case that the query is directed towards relatively rare event-message types. In this case, many containers are opened and processed by the query-processing subsystem even though none of the log-file entries in the many containers are relevant to the query. The computational and temporal costs of opening containers and accessing their contents are quite significant for queries with relatively unconstrained parameters that may require the query-processing subsystem to open and process the contents of hundreds, thousands, or more containers.

Figure 18:
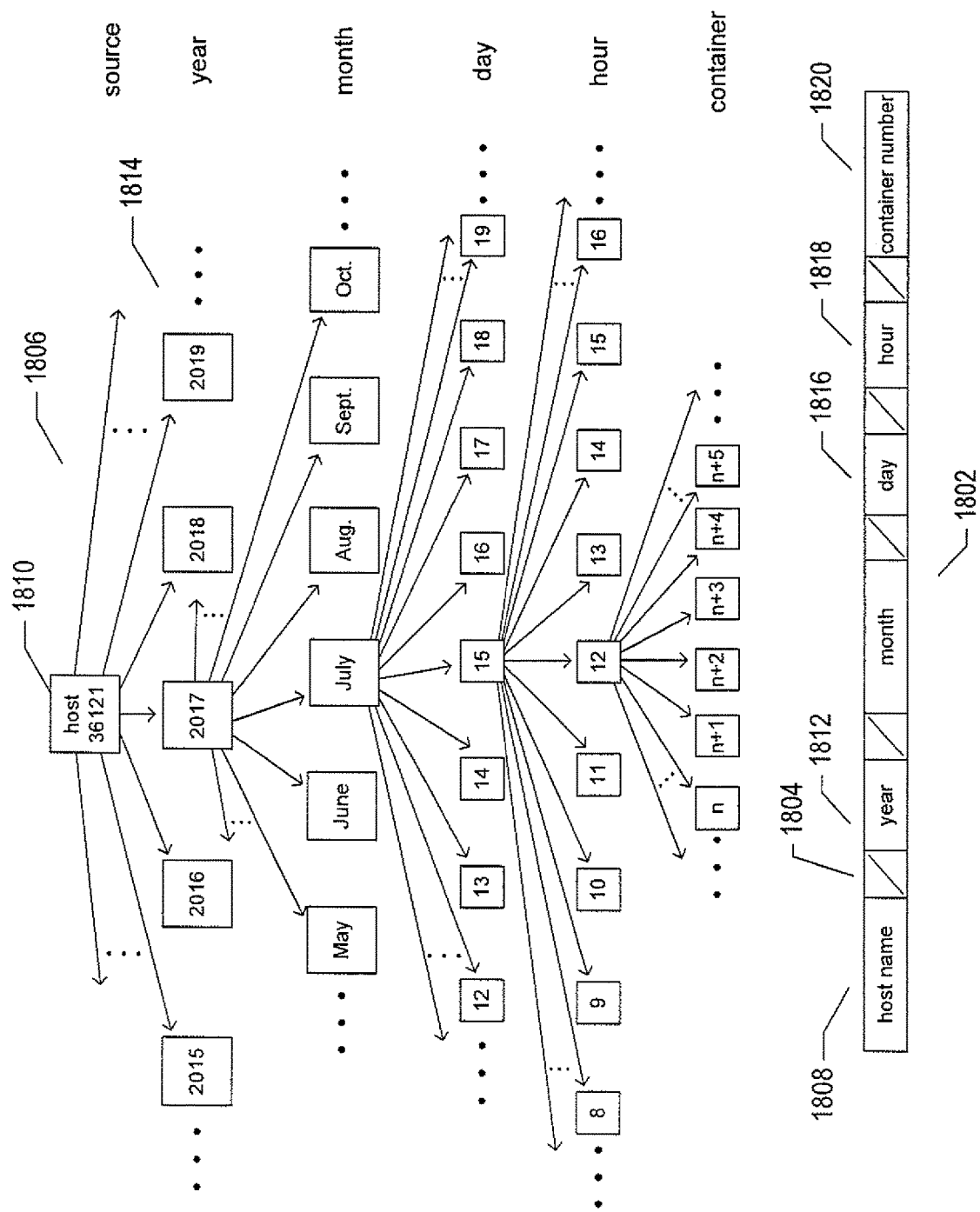
FIG. 18 illustrates the use of a hierarchical container-directory structure to facilitate query processing.

One approach to organizing containers in order to provide for efficient query processing uses a traditional hierarchical container-directory structure. FIG. 18 illustrates the use of a hierarchical container-directory structure to facilitate query processing. In this scheme, each container has a path-based container name 1802 that includes "/" delimiters, such as "/" delimiter 1804, that separate ordered, hierarchical terms. The path-based container name 1802 represents a forest of hierarchical tree-like directory structures, such as a hierarchical tree-like directory structure 1806, similar to the directory structures provided by many operating-system-provided file systems. The first term in the path-based container name 1808 indicates an event-message source, or set of event-message sources, corresponding to a row of containers in the two-dimensional container matrix shown in FIGS. 17B-C. Thus, the hierarchical tree-like directory structure. 1806 has a root node 1810 corresponding to a particular event-message source or set of event-message sources. In the current example, event-messages sources are host computers. Of course, the hierarchical tree-like directory structures rooted by host nodes may be gathered into a single hierarchical tree-like data structure, or directory, using a higher-level node with host-node children. The next term 1812 in the path-based container name indicates the year in which the log-entries contained in the container were processed and stored. This term corresponds to a next-level of nodes 1814 in the hierarchical tree-like directory structure. Similarly, two additional terms, and corresponding hierarchical tree-like directory-structure levels, specify the day 1816 and hour 1818 during which the log-file entries were processed and stored. The final term 1820 is a sequence number specifying a particular container containing log-file entries collected during the hour, day, month, and year specified by preceding terms in the path-based name from a source specified by the first term 1808. Using the hierarchically structured container directory, a query-processing subsystem can easily identify the containers that contain log-file entries for specified event-message sources during a specified time window. As mentioned above, many other types of container organizations may be used, but in most cases, at least a certain number of query constraints can be satisfied by identifying subtrees within the directory structures that contain the containers that are relevant to a particular query. However, this approach fails to solve the above-mentioned problem of identifying containers that contain log-file entries with particular event types.

Figure 19:
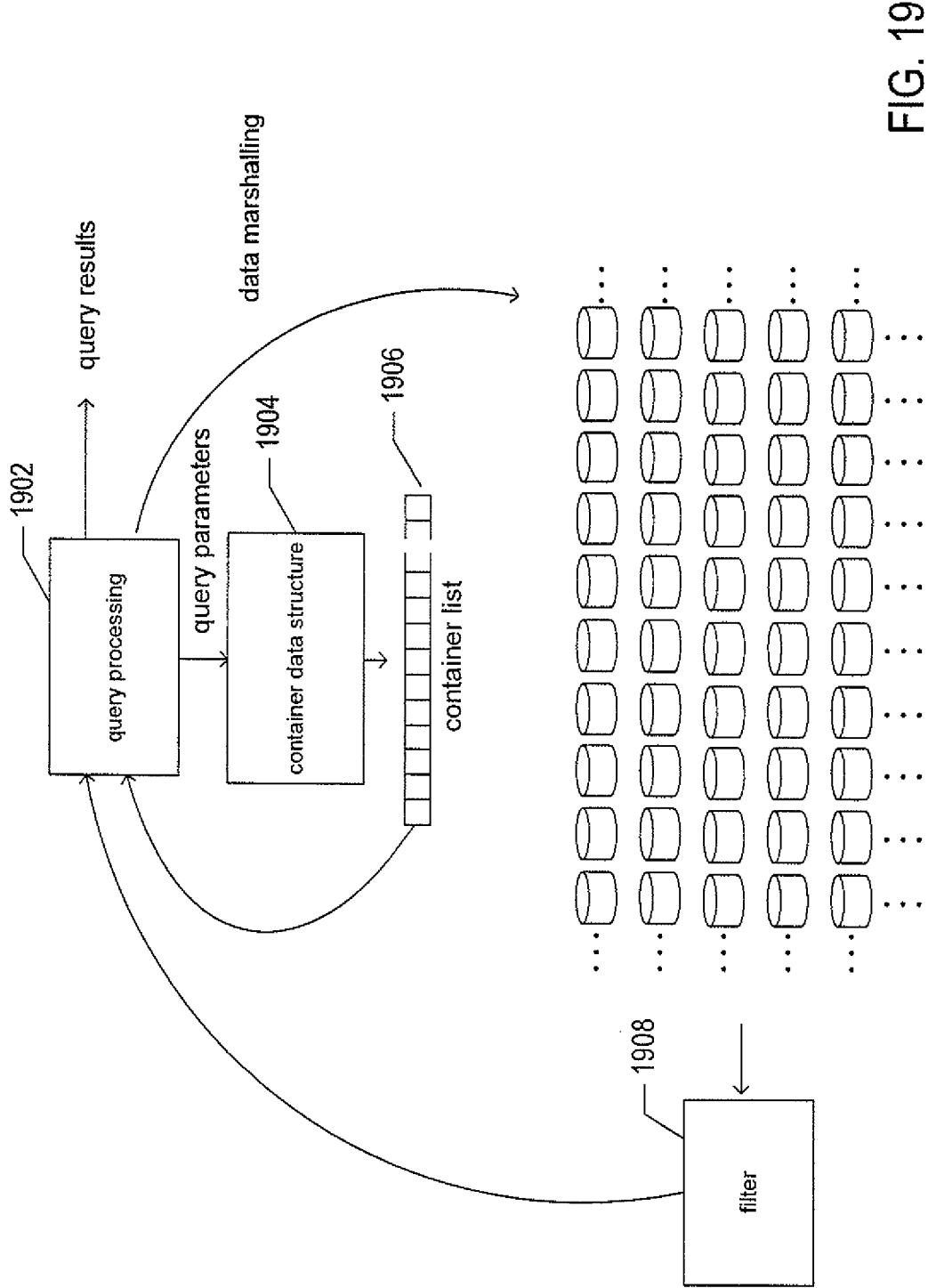
FIG. 19 illustrates a general approach to container access for a query-processing subsystem that executes queries against stored log-file entries.

FIG. 19 illustrates a general approach to container access for a query-processing subsystem that executes queries against stored log-file entries. The query-processing subsystem 1902 evaluates an input query in order to determine the values of various parameters that define, in part, the query, such as, for example, the relevant event-message sources and the relevant time frame or time window for log-file entries that are relevant to the query. These parameter values are passed to a container-finder module that uses the hierarchical, tree-like container data structures, such as container data structure 1904, discussed above with reference to FIG. 18, to generate a list of relevant containers 1906 that is returned to the query-processing subsystem 1902. As discussed below, additional data structures facilitate identifying containers that include log-file entries with specific event types. The query-processing subsystem then accesses the relevant containers identified in the container list 1906, reading of the log-file entries in the relevant containers and applying filters to the log-file entries 1908 in order to determine the set log-file entries relevant to generating and returning query results. In certain cases, such as query as discussed above with reference to FIG. 16A-B, the query results may be computed continuously as relevant log-file entries are produced by application of one or more filters 1908. By opening and accessing the contents of only those containers identified in the container list 1906 provided by the container-finding module called by the query-processing subsystem, the extremely inefficient opening and reading containers that do not contain relevant log-file entries is avoided.

Figure 20:
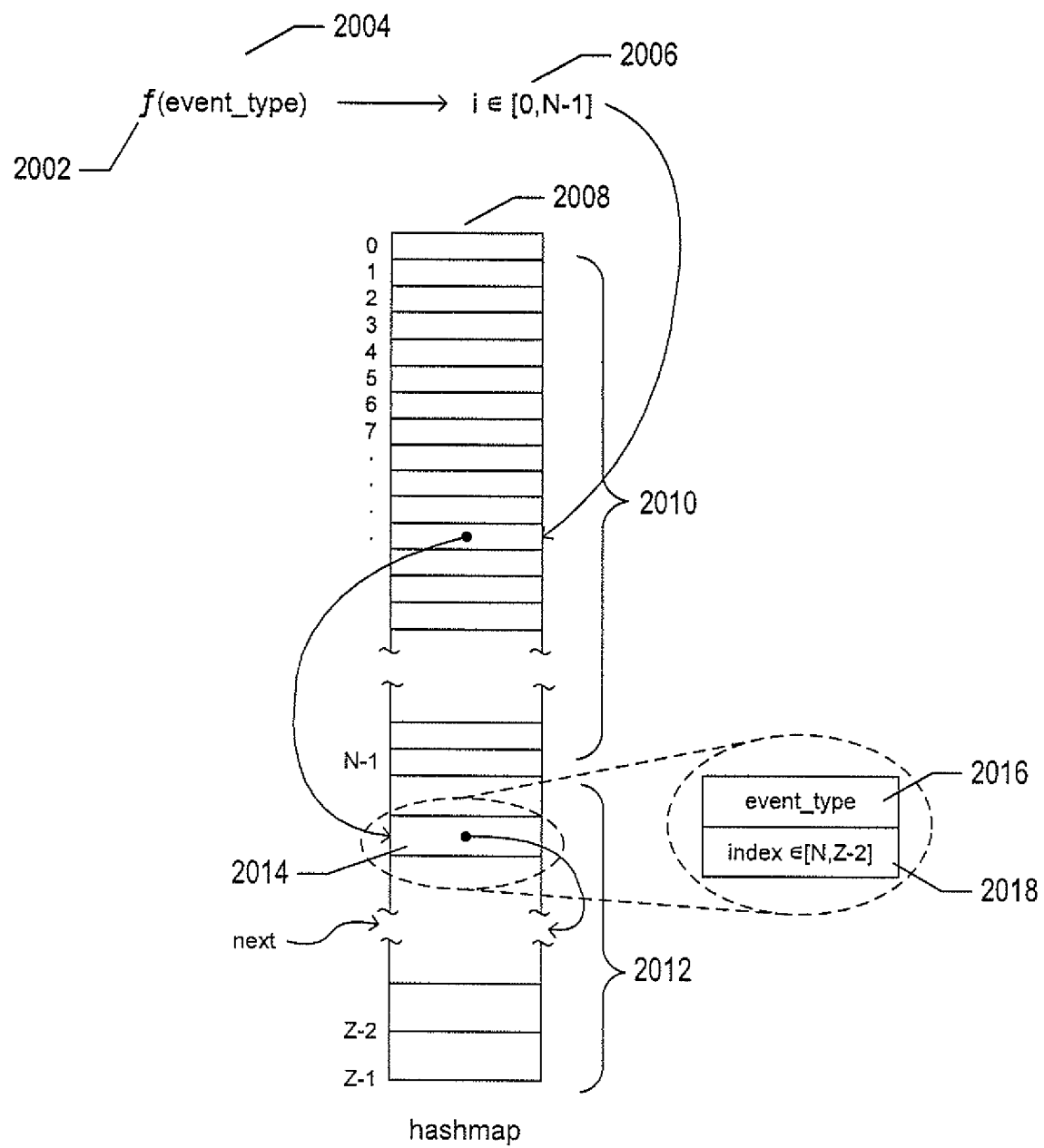
FIG. 20 illustrates a hashmap data structure that is used, in one implementation of the currently disclosed system, to identify event types of the log-file entries contained in a particular container, without the need to open and access the contents of the container.

FIG. 20 illustrates a hashmap data structure that is used, in one implementation of the currently disclosed system, to identify event types of the log-file entries contained in a particular container, without the need to open and access the contents of the container. Access to a hashmap involves applying a hash function 2002 to a numerical or alphanumeric representation of an event type 2004 in order to obtain an index 2006 into the hashmap. The hashmap 2008 includes a first portion 2010 containing list pointers indexed by indexes 2006 produced by the hash function 2002. This first portion of the hashmap contains N list pointers, where the range of the indexes produced by the hash function is [0, N−1]. When a list pointer indexed by an index generated by the hash function applied to an event type has the value 0, the event type has not been entered into the hashmap, in turn indicating that the container associated with the hashmap does not contain a log-file entry with the event type. By contrast, when a list pointer indexed by an index generated by the hash function applied to an event type has a non-zero value, the non-zero value server as an index, or pointer, into the second portion of the hashmap 2012 which contains linked lists for those event types that have been entered into the hashmap. The link lists are lists of nodes, with the second portion of the hashmap 2012 containing Z/2 nodes. Each node, such as node 2014, includes an event type 2016 and an index or pointer 2018 that is either 0, indicating that the node is the last node in a linked list, or an index to the next node in a linked list. As discussed below, when a log-file entry is stored in a container by an event-message-collection subsystem, the event type of the log-file entry is entered into a hashmap associated with the container. A container-finder module, discussed above with reference to FIG. 19, can access a hashmap associated with the container to determine whether or not one or more log-file entries having a particular event type are contained within the container without opening the container and without reading through the log-file entries within the container. Using hashmaps associated with containers in addition to hierarchical container directories, as discussed above with reference to FIG. 18, allows the container-finder module to efficiently generate the above-discussed container list (1906 in FIG. 19).

Figure 21A:
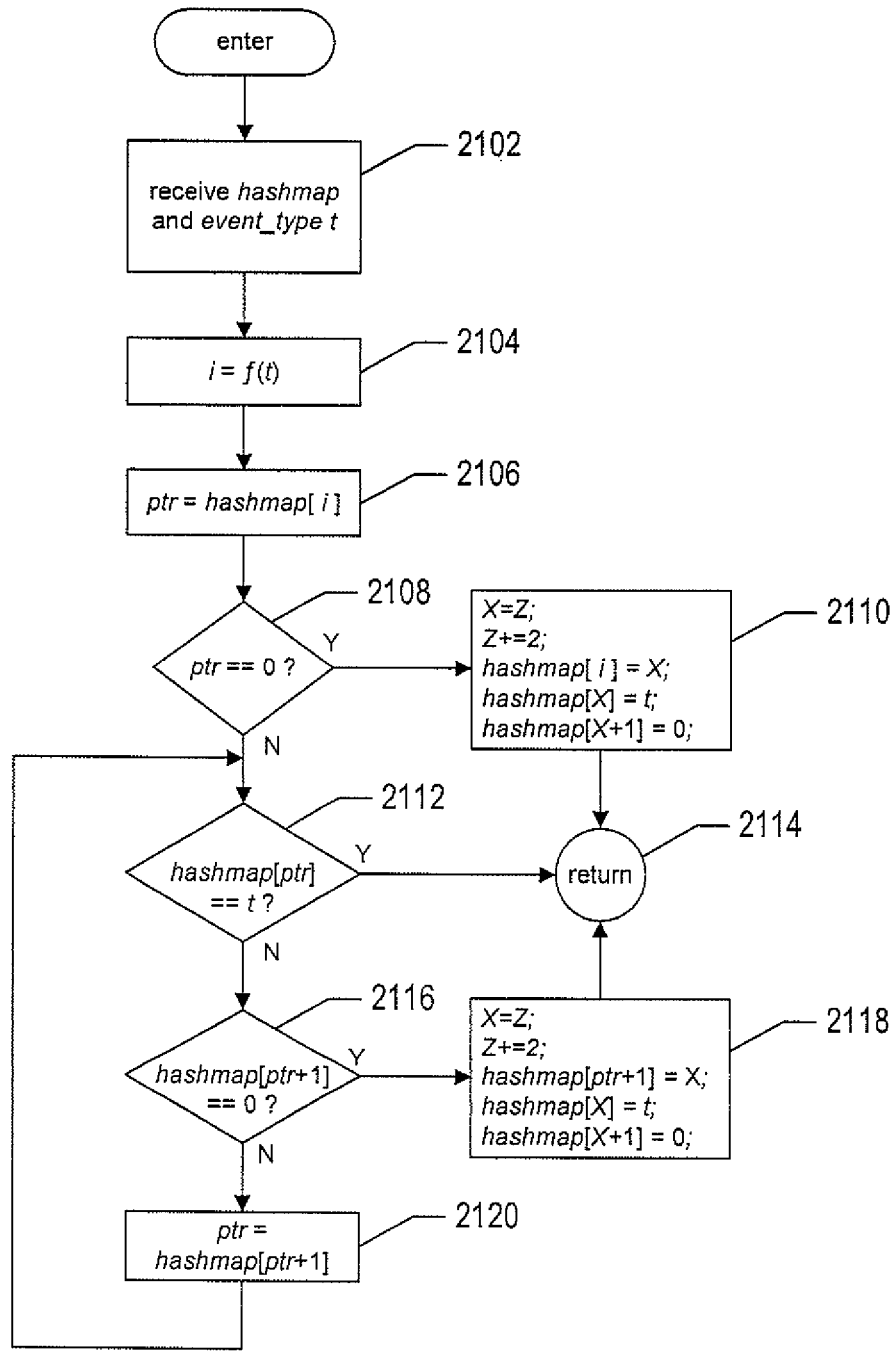
FIGS. 21A-C provide control-flow diagrams for the basic operations carried out by the event-message-collecting and query-processing subsystems on hashmaps associated with containers.
Figure 21B:
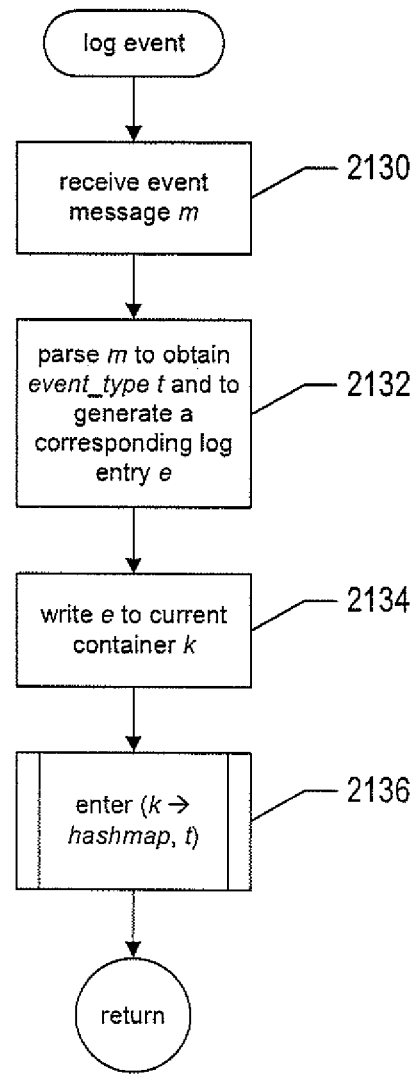
Figure 21C:
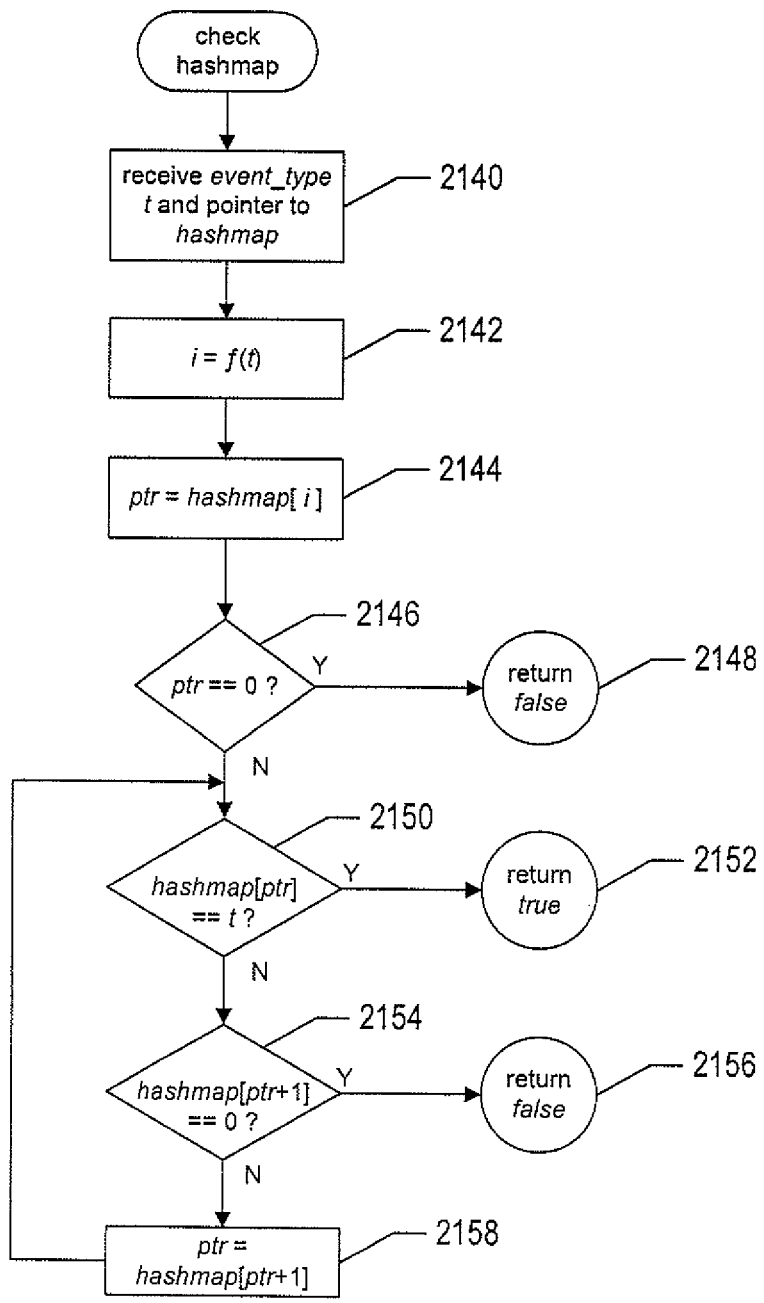

FIGS. 21A-C provide control-flow diagrams for the basic operations carried out by the event-message-collecting and query-processing subsystems on hashmaps associated with containers. FIG. 21A provides a control-flow diagram for the routine "enter," which is called by an event-message-collecting subsystem to enter an event type into a hashmap and is also called by a hashmap-merging routine, discussed below. In step 2102, the routine "enter" receives a reference to a hashmap and an event type t. In step 2104, the routine "enter" applies the hash function for the hashmap to the event type t in order to generate an index i. Step 2106, the routine "enter" accesses the hashmap entry indexed by the index i to obtain a value stored in the local variable ptr. When the local variable ptr has the value 0, as determined in step 2108, the event type t is entered into the hashmap, in step 2110, by replacing the contents of the entry indexed by the index i with an index to a new node in the second part of the hashmap, placing the event type t to the first field of the new node, and setting the second field of the new node to 0. The length of the second portion of the hashmap is appropriately adjusted to generate the new node. The hashmaps associated with containers are in-memory data structures, the sizes of which can be dynamically adjusted to enter new nodes to store newly entered event types. When the value of ptr is not 0, as also determined in step 2108, and when the event type in the first field of the node pointed by the value of ptr is equal to the event type t, as determined in step 2112, the routine "enter" returns 2114, since the event type t is already resident within the hashmap. Otherwise, when the second field of the node is 0, as determined in step 2116, a new node is added to the hashmap to contain the event type t, in step 2118, in similar fashion to the addition of a new node in step 2110. Otherwise, the local variable ptr is set to the contents of the second field of the node, in step 2120, and control returns to step 2112 to evaluate the node pointed to by the current contents of the local variable ptr. Although the hashmaps associated with containers are in-memory data structures, they may also be stored in mass storage, along with containers, and retrieved from mass storage when an instance of the query-processing subsystem is initialized.

FIG. 21B provides a control-flow diagram for a routine "log event," which is called by the event-message-collection system to process a received event message. In step 2130, the routine "log event" receives a next event message m. In step 2132, the routine "log event" parses the received event message m to obtain the event type t associated with the message and to generate a corresponding dating log-file entry e. In step 2134, the routine "log event" writes the generated log-file entry to a current container k, and, in step 2136, calls the routine "enter," discussed above with reference to FIG. 21A, to enter the event type t into the hashmap associated with the container k.

FIG. 21C provides a control-flow diagram for a routine "check hashmap." This routine is called by the container-finder module called by the query-processing subsystem to determine whether log-file entries associated with a particular event type are contained in the container with which the hashmap passed by reference to the routine "check hashmap" is associated. In step 2140, the routine "check hashmap" receives the event type t and a pointer to the hashmap. In step 2142, the routine "check hashmap" applies the hash function to the event type t in order to generate an index i. Step 2144, the routine "check hashmap" accesses the hashmap entry indexed by the index i, placing the value in the hashmap entry into a local variable ptr. When the value of ptr is 0, as determined in step 2146, the routine "check hashmap" returns false 2148. When the first field of the node pointed to by the contents of the local variable ptr contains the event type t, as determined in step 2150, the routine "check hashmap" returns the value true, in step 2152. Otherwise, when the second field of the node pointed to by the contents of the local variable ptr is 0, as determined in step 2154, the routine "check hashmap" returns the value false, in step 2156. Otherwise, the local variable ptr is set to the value contained in the second field of the node, in step 2158, and control flows back to step 2150.

Figure 22A:
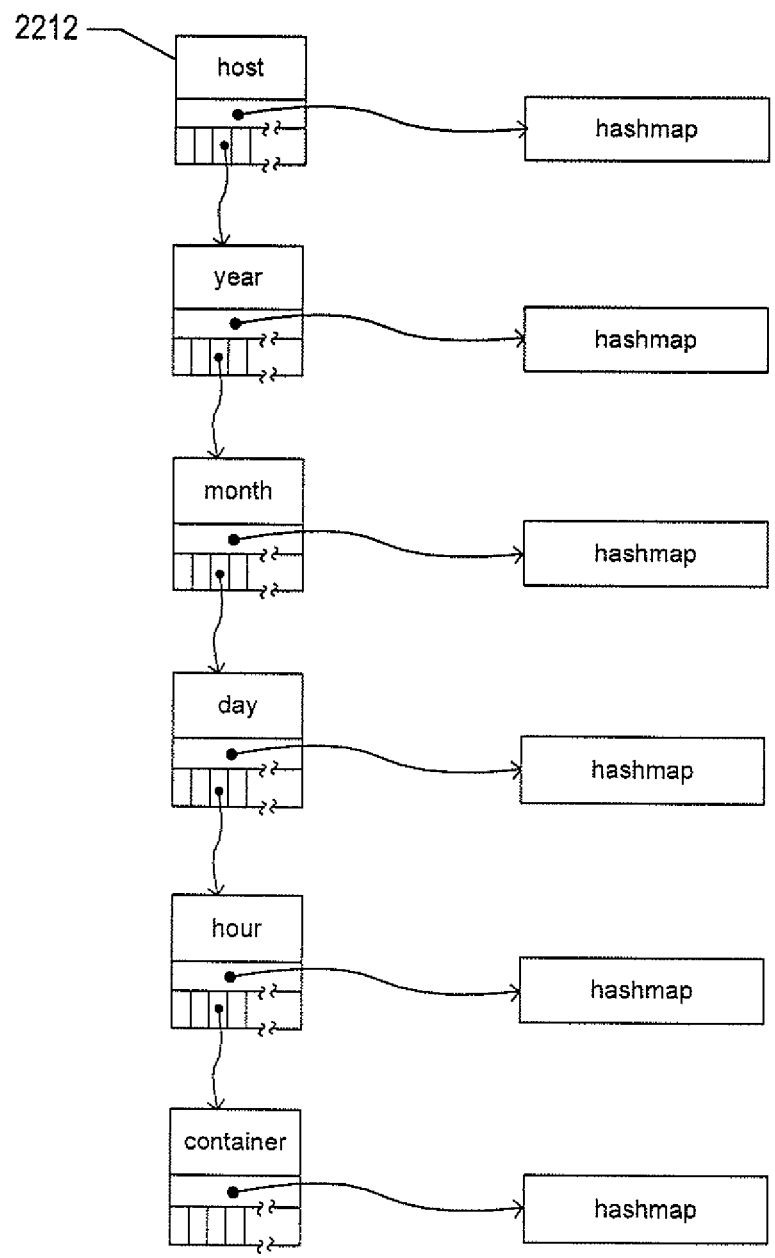
FIGS. 22A-E illustrate a more complex use of hashmaps associated with containers in particular implementations of the currently disclosed system.

FIGS. 22A-E illustrate a more complex use of hashmaps associated with containers in particular implementations of the currently disclosed system. As shown in FIG. 22A, each node in the nodes of a hierarchical tree-like container directory is associated with a hashmap. In FIG. 22A, a single node from each level of the hierarchical tree-like container directory is shown, such as the host node 2202, in a column of nodes that represent the nodes along a path through the tree corresponding to a path-based container name. Whenever a container is filled and then closed, the hashmap associated with the container is merged with the hashmaps of the nodes in the representation of the container name at higher levels of the hierarchical tree-like container directory. In this fashion, the container-finder module can quickly identify whether any container in a hierarchical tree-like container directory, or a subtree within the hierarchical tree-like container directory, contains a log-file entry with a particular event type.

Figure 22B:
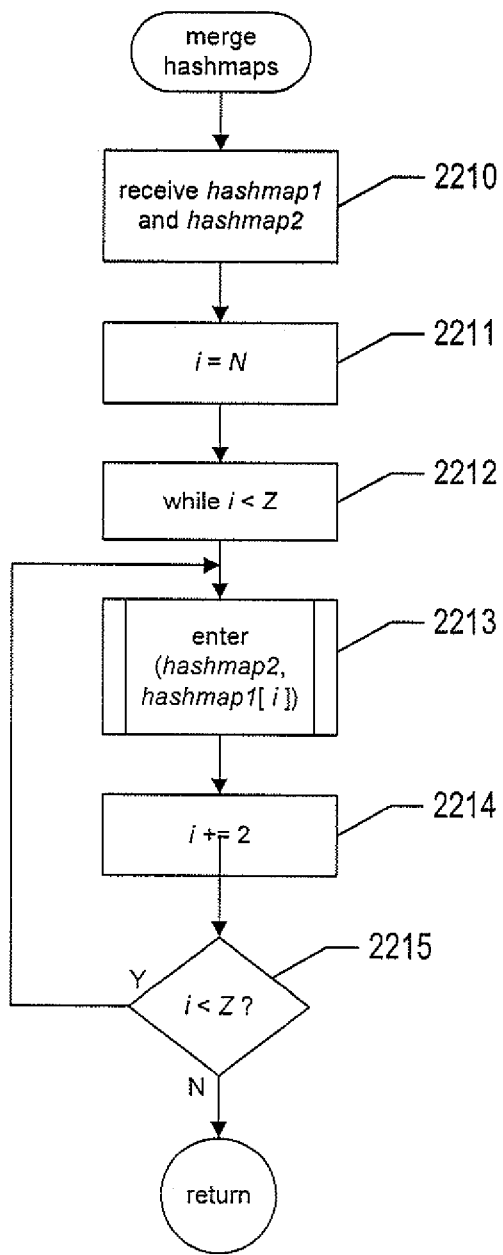

FIG. 22B provides a control-flow diagram for a routine "merge hashmaps." This routine is called to merge a lower-level-node hashmap with a higher-level-node hashmap in the more complex implementation discussed above with reference to FIG. 22A. In step 2210, the routine "merge hashmap" receives references to two hashmaps. In step 2211, the routine "merge hashmap" sets the local variable i to the value N, the length of the first portion of the hashmap. Then, in the while-loop of steps 2212-2215, each event type in the first hashmap is entered into the second hashmap in step 2213.

Figure 22C:
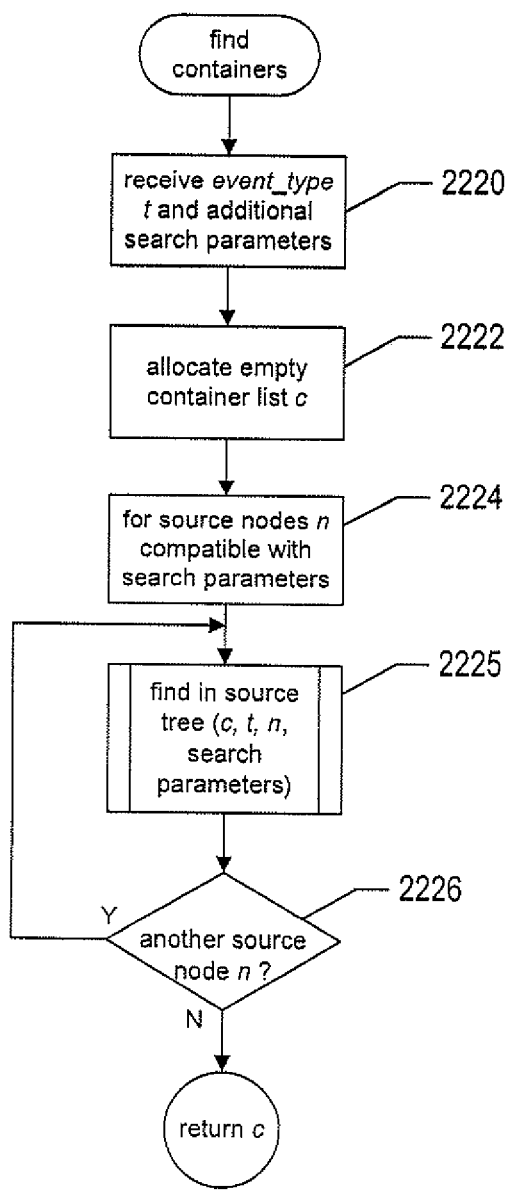

FIG. 22C provides a control-flow diagram for the routine "find containers." In step 2220, the routine "find containers" receives an event type t and additional search parameters. In step 2222, the routine "find containers" allocates an empty container list c. Then, in the while-loop of steps 2224-2226, the routine "find containers" calls the routine "find in source tree," in step 2225, for every source or host-node root of a hierarchical tree-like container directory compatible with the search parameters.

Figure 22D:
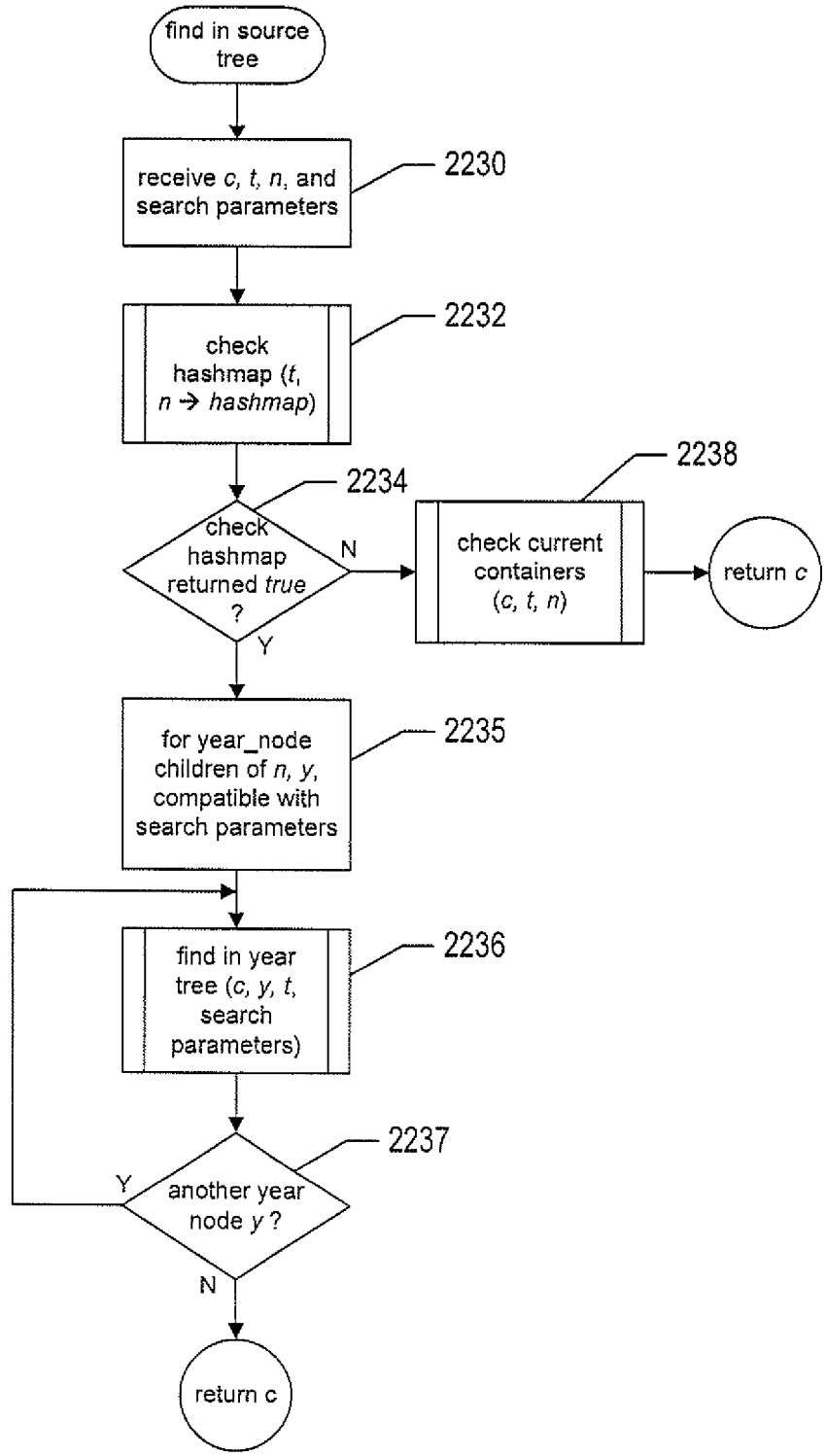

FIG. 22D provides a control-flow diagram for the routine "find in source tree," called in step 2225 of FIG. 22C. In step 2230, the routine "find in source tree" receives a pointer to the container list, the event type t, a pointer to the host node of a container directory tree n, and additional search parameters. In step 2232, the routine "find in source tree" calls the routine "check hashmap" to check the hashmap associated with the host node to determine whether or not any containers in the tree include the event type t. When the routine "check hashmap" returns the value true, as determined in step 2234, then, in the for-loop of steps 2235-2237, the routine "find in source tree" calls a routine "find in year tree" for each child year node of the host node n. Otherwise, in step 2238, the routine "find in source tree" calls a routine "check current containers" to check any open containers in the tree rooted by the host node n for the event type t, since the event types in the open containers have not yet been propagated up through the hierarchical tree-like container directory. The routine "find in year tree" is similar to the routine "find in source tree," and additional similar routines for month nodes and day nodes are called to traverse the hierarchical tree-like container directory. The routine for finding containers within subtrees rooted by day nodes, "find in day tree," calls a routine "find in hour tree" to look for any containers referenced by the hour node that contain the event type t.

Figure 22E:
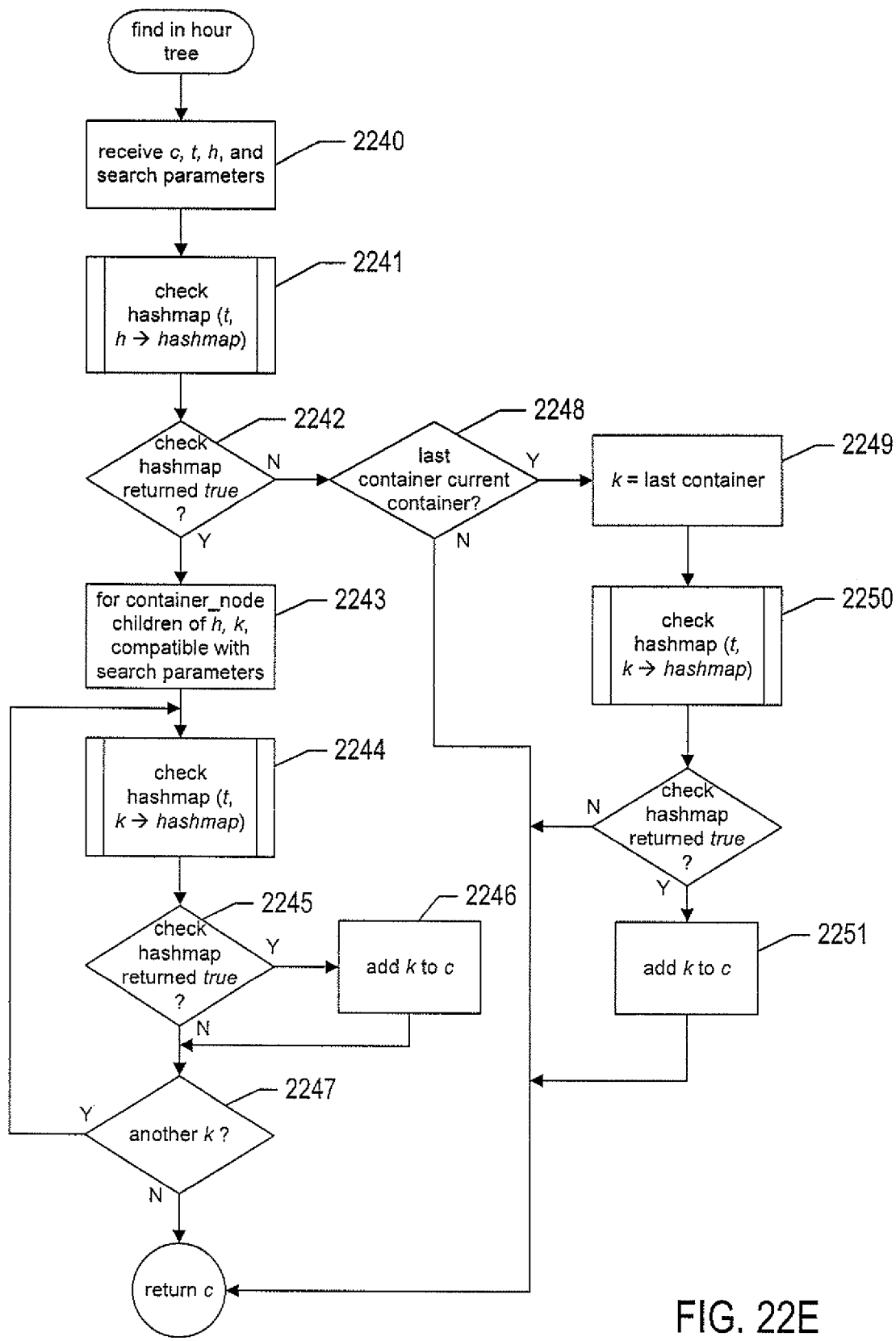

FIG. 22E provides a control-flow diagram for the routine "find an hour tree." In step 2240, the routine "find an hour tree" receives a reference to the container list c, the event type t, a reference to an hour node age h, and additional search parameters. In step 2241, the routine "find in hour tree" calls the routine "check hashmap" to determine whether the hashmap associated with the hour node indicates that the hour node references a container containing log-file entries of the type t. When the routine "check hashmap" returns the value true, as determined in step 2242, then, in the for-loop of steps 2243-2247, the routine "find in hour tree" calls the routine "check hashmap" for each container referenced by the hour node h. When the value returned by the routine "check hashmap" indicates that the container reference by the container reference k includes one or more log-file entries of event type t, as determined in step 2245, the reference k is added to the container list c, in step 2246. When the hashmap associated with the hour node h does not indicate that a container child of the hour node h contains a log-file entry of event type t, as determined in step 2242, then, in step 2248, the routine "find in hour tree" determines whether the last container referenced by the hour node h is a current, open container. If so, then a reference to the last container, k, is initialized in step 2249 and the routine "check hashmap" is called, in step 2250, to determine whether the current container contains the event type t. If so, then the reference k is added to the container list c, in step 2251.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to generate alternative implementations of the above-discussed method, including hardware platform, operating system, virtualization method, modular organization, control structures, data structures, and other such parameters. Of course, the above-described routines for entering event types into hashmaps and for checking hashmaps for event types can be straightforwardly modified to receive multiple event types and output a Boolean value indicating, for example, whether all of the input event types are entered in the hashmap or, as another example, whether any of the input event types are entered in the hashmap. In alternative implementations, data structures other than hashmaps, such as sparse arrays, can be associated with containers to store information indicating the event types of log-file entries in the containers.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A query-processing subsystem within a distributed computer system comprising:
one or more processors;
one or more memories; and
computer instructions, stored in one or more of the one or more memories that, when executed by one or more of the one or more processors, control the query-processing subsystem to
receive a query from a requesting computer system,
determine, from the received query, a set of parameters,
identify a set of containers that contain log-file entries relevant to the query using the set of parameters, information included in container names, and information contained in an in-memory data structures, each in-memory data structure associated with a particular container,
open the identified set of containers and process the log-file entries in the identified set of containers to generate a query result, and
return the query result to the requesting computer system.

2. The query-processing subsystem of claim 1 wherein the containers are stored in mass-storage devices within the distributed computer system.

3. The query-processing subsystem of claim 1 wherein the information included in a container name includes:
information indicating one or more event-message sources of the log-file entries; and
information indicating a time period during which the log-file entries were generated from event messages and stored in the container.

4. The query-processing subsystem of claim 1 wherein the in-memory data structure associated with a container stores indications of the event-types of the log-file entries in the container.

5. The query-processing subsystem of claim 4 wherein the in-memory data structure associated with a container is one of:
a hashmap that stores event types; and
a sparse array that stores event types.

6. The query-processing subsystem of claim 1 wherein the in-memory data structures are additionally persistently stored in mass storage within the distributed computer system.

7. The query-processing subsystem of claim 1 wherein the in-memory data structures are additionally associated with nodes of a hierarchical, tree-like container directory.

8. A method that efficiently processes queries directed to log-file entries stored in containers, the method comprising:
receiving a query from a requesting computer system,
determining, from the received query, a set of parameters,
identifying a set of containers that contain log-file entries relevant to the query using the set of parameters, information included in container names, and information contained in an in-memory data structures, each in-memory data structure associated with a particular container,
opening the identified set of containers and processing the log-file entries in the identified set of containers to generate a query result, and
returning the query result to the requesting computer system.

9. The method of claim 8 wherein the method is carried out by a query-processing subsystem within a distributed computer system comprising one or more processors; one or more memories; and computer instructions, stored in one or more of the one or more memories that, when executed by one or more of the one or more processors, control the query-processing subsystem to carry out the method.

10. The method of claim 9 wherein the containers are stored in mass-storage devices within the distributed computer system.

11. The method of claim 9 wherein the information included in a container name includes:
information indicating one or more event-message sources of the log-file entries; and
information indicating a time period during which the log-file entries were generated from event messages and stored in the container.

12. The method of claim 9 wherein the in-memory data structure associated with a container stores indications of the event-types of the log-file entries in the container.

13. The method of claim 9 wherein the in-memory data structure associated with a container is one of:
a hashmap that stores event types; and
a sparse array that stores event types.

14. The method of claim 9 further including persistently storing the in-memory data structures in mass storage within the distributed computer system.

15. The method of claim 9 further including associating the in-memory data structures with nodes of a hierarchical, tree-like container directory.

16. The method of claim 9 further including using, by the requesting computer system, the returned query result to carry out one or more monitoring and administration tasks, where monitoring and administration tasks include:

detecting anomalous distributed-computer-system states;

detecting potential problems in the distributed computer system; and automatically generate alarms and warning notifications to automated failure-detection and amelioration subsystems as well as to human administrators and other personnel.

17. A physical computer-readable device that stores a set of computer instructions that, when executed on one or more processors of a query-processing subsystem, within a distributed computer system, that additionally includes one or more memories, controls the query-processing subsystem to:

receive a query from a requesting computer system, determine, from the received query, a set of parameters, identify a set of containers that contain log-file entries relevant to the query using the set of parameters, information included in container names, and information contained in an in-memory data structures, each in-memory data structure associated with a particular container, open the identified set of containers and process the log-file entries in the identified set of containers to generate a query result, and return the query result to the requesting computer system.

18. The physical computer-readable device of claim 17 wherein the containers are stored in mass-storage devices within the distributed computer system.

19. The physical computer-readable device of claim 17 wherein the information included in a container name includes:

information indicating one or more event-message sources of the log-file entries; and information indicating a time period during which the log-file entries were generated from event messages and stored in the container.

20. The physical computer-readable device of claim 17 wherein the in-memory data structure associated with a container stores indications of the event-types of the log-file entries in the container as is one of:

a hashmap that stores event types; and a sparse array that stores event types.

* * * * *